US012569861B2

(12) United States Patent
Norgren et al.

(10) Patent No.: US 12,569,861 B2
(45) Date of Patent: Mar. 10, 2026

(54) COMPOUNDS, METHODS, AND SYSTEMS FOR BENEFICATION OF RARE EARTH ELEMENTS BY FLOTATION AND GRAVITY CONCENTRATION

(71) Applicant: COLORADO SCHOOL OF MINES, Golden, CO (US)

(72) Inventors: Carl Alexander Norgren, Golden, CO (US); Nathanael Williams, Golden, CO (US); Dylan Everly, Golden, CO (US); Corby Anderson, Golden, CO (US); Vyacheslav Bryantsev, Golden, CO (US); Santa Jansone-Popova, Golden, CO (US); Philip Keller, Golden, DE (US)

(73) Assignee: Colorado School of Mines, Golden, CO (US)

( * ) Notice: Subject to any disclaimer, the term of this patent is extended or adjusted under 35 U.S.C. 154(b) by 932 days.

(21) Appl. No.: 17/392,102

(22) Filed: Aug. 2, 2021

(65) Prior Publication Data

US 2022/0040707 A1 Feb. 10, 2022

Related U.S. Application Data

(60) Provisional application No. 63/060,127, filed on Aug. 2, 2020.

(51) Int. Cl.
*B03D 1/006* (2006.01)

(52) U.S. Cl.
CPC .................................... *B03D 1/006* (2013.01)

(58) Field of Classification Search
None
See application file for complete search history.

(56) References Cited

PUBLICATIONS

Norgren, C. Alex. Ultra-Fine Gravity Separation of Rare Earth Minerals. Colorado School of Mines, 2018. (Year: 2018).*
(Continued)

*Primary Examiner* — Anthony M Liang
(74) *Attorney, Agent, or Firm* — Dorsey & Whitney LLP

(57) ABSTRACT

Disclosed herein are methods, devices, and systems for effectively separating carbonate gangue from bastnaesite without sacrificing significant REO grade or recovery. In some embodiments, centrifugal concentrators may beneficiate Ultra-Fine (UF) bastnaesite and calcite bearing flotation concentrates. The disclosed methods, devices, and systems can achieve initial gravity REO recoveries exceeding 90% while rejecting on the order of 25% to 35% of the total calcium from an assortment of rougher and cleaner flotation concentrates. Addition of stages of cleaner UF Falcon gravity separation may be operated in an open circuit configuration, from an original fine feed of 35 microns containing 50.5% REO and 5.5% Ca, to upgrade up to approximately 59% REO and 2.0% calcium. The disclosed methods, devices, and systems may comprise UF gravity concentration that may provide for recovery of rare earth oxides at levels of greater than 70%, 80% and 90%, while also rejecting more than 15%, 20%, 25%, 30, or 35% of the total calcium. Also described are benefication of fine feed of 35 microns containing 50.5% REO and 5.5% Ca, to approximately 59% REO and 2.0% calcium. In some embodiments, the disclosed methods, compounds, and systems may be used to complement existing or modified flotation systems.

16 Claims, 25 Drawing Sheets

(56) References Cited

PUBLICATIONS

Anderson, Caelen D. , "Improved Understanding of Rare Earth Surface Chemistry and Its Application to Froth Flotation", Colorado School of Mines, Doctor of Philosphy (Metallurgial and Materials Engineering), 268 pgs.
Schriner, Doug, "Advanced Beneficiation of Bastnaesite Ore through Centrifugal Concentration and Froth Flotation", Colorado School of Mines, Master of Science (Metallurgical and Materials Engineering), 116 pgs.
Williams, Nathanael, "Bastnaesite Beneficiation by Froth Flotation and Gravity Separation", Colorado School of Mines, Master of Science (Metallurgical and Materials Engineering), 151 pgs.

* cited by examiner

COMPOUNDS, METHODS, AND SYSTEMS FOR BENEFICATION OF RARE EARTH ELEMENTS BY FLOTATION AND GRAVITY CONCENTRATION

CROSS-REFERENCE TO RELATED APPLICATIONS

This application claims priority to U.S. Provisional Application No. 63/060,127, filed Aug. 2, 2020, entitled "Compounds, Methods, and Systems for Benefication of Rare Earth Elements by Flotation and Gravity Concentration," which is incorporated herein by reference in its entirety.

GOVERNMENT LICENSE RIGHTS

This invention was made with government support under Contract No. DE-AC02-07CH11358 awarded by the Department of Energy. The government has certain rights in the invention.

FIELD

The described methods, compounds, and systems are useful in the benefication of rare earth element-containing ores, for example bastnaesite containing ore, especially fine and ultra-fine fractions.

BACKGROUND

The development of the Ultra-Fine (UF) Falcon concentrator started in earnest in order to better treat a tantalum flotation concentrate in light of a change to a finer mineralogy. To this end, the first industrial UF Falcon was commissioned on April 2005, making it a relatively young technology at the time of writing compared to Knelson and traditional Falcon centrifugal concentrators. In its debut, a single UF Falcon was able to outperform and replace the entire previous gravity circuit consisting of Mozely gravity separators and cyclones as is pictured below in FIG. 1.

DETAILED DESCRIPTION

UF Falcons operate on a similar principal to other centrifugal concentrators, namely in the use of a spinning bowl to induce stratification of light and heavy minerals, however there are a number of differences in terms of the unit itself.

Figure 1:
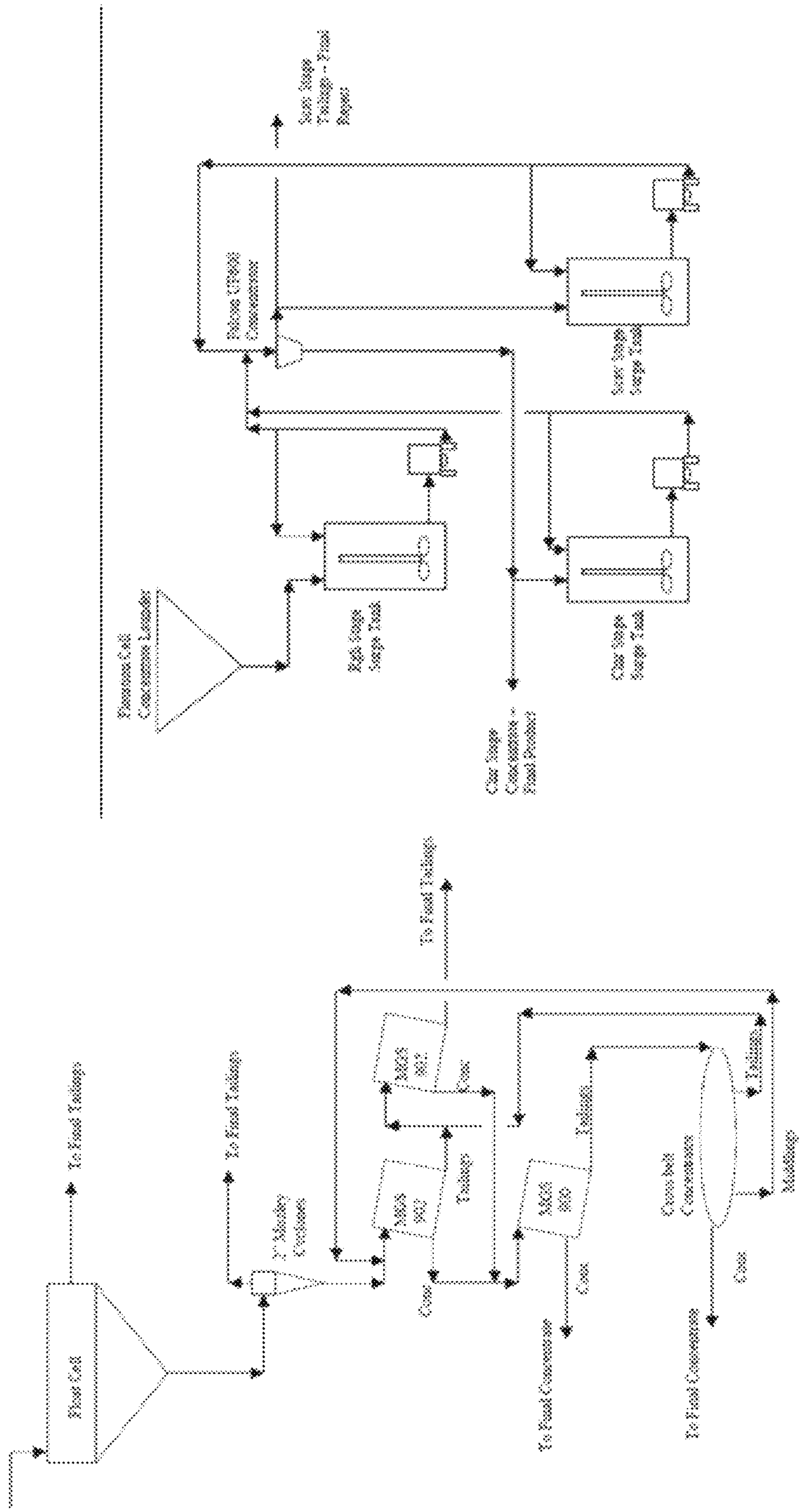
FIG. 1. Original TANCO tantalum gravity circuit (left) and subsequent replacement with a UF Falcon circuit (right).
Figure 2:
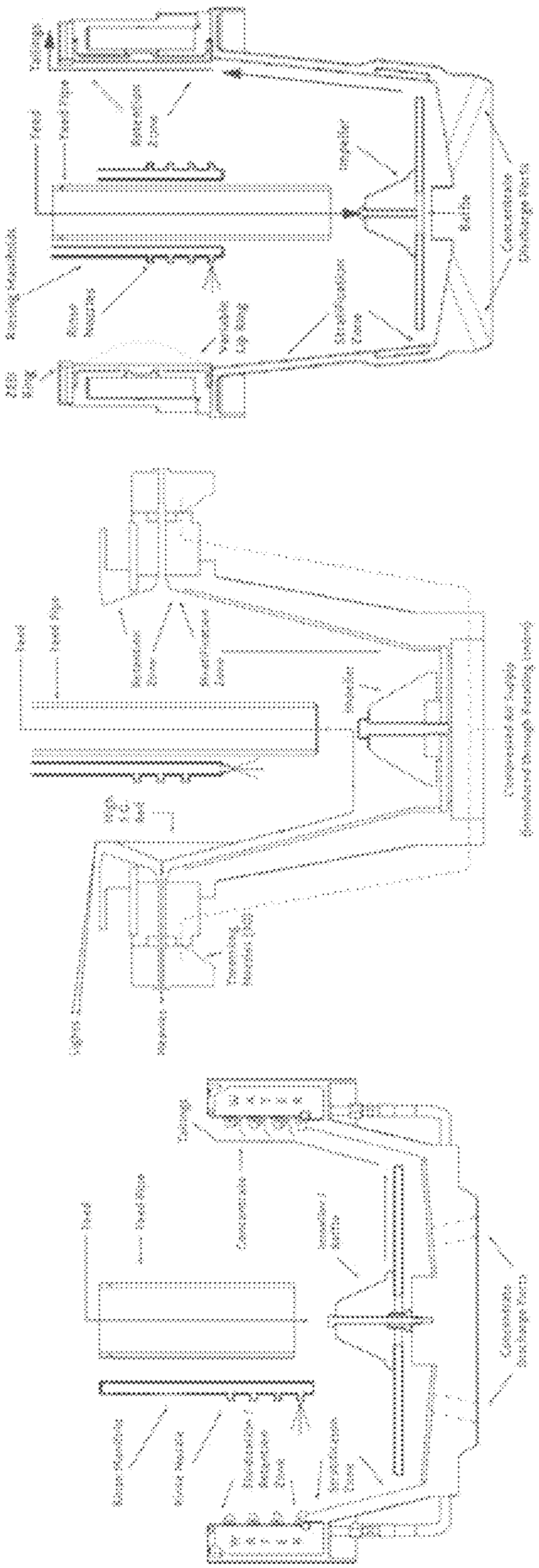
FIG. 2. Cross sections of bowl of SB (left), continuous (center) and UF Falcon (right). (Sepro brochures)

Most significantly, as the name suggests, the UF Falcon is specifically intended to treat finer feeds of anywhere from 75 to 3 microns. Another consequence of the use of such comparatively fine feeds is that the UF Falcon, including at lab scale, utilizes no fluidization water. Additionally, it is capable of an even higher G-Force than traditional continuous Falcons, with a maximum value of up to 600 G's. Lastly, the UF bowl is nearly vertical, with the gravity concentrate retention zone consisting of a single variable lip ring in the case of industrial scale units. A side by side comparison of bowl cross sections of the industrial SB, continuous, and UF Falcons are shown below in FIG. 2.

Due to the bowl configuration in the UF Falcon, it is only available as a semi-batch unit, however, this also enables it to achieve, should the user so desire, a wide range of mass pulls reportedly up to 90% (Sepro website, not brochures), with more typically reported upper bounds of 40%. (Sepro UF brochure.)

The drawbacks, compared to other centrifugal concentrators, are that the UF Falcon exhibits a comparatively high unit power consumption per ton of solids. Additionally, as of the time of writing, the largest commercially available model has a typical maximum throughput of only 2 tph solids with an installed motor of 60 HP. The ability to build a larger unit is reportedly limited by mechanical considerations necessary to induce 600 G's, thus for the foreseeable near future the use of UF Falcons is practically restricted to treating low throughput process streams such as flotation concentrates.

Whole Ore UF Falcon Testing

For contextual purposes, it should be noted that prior to gravity testing of flotation concentrates, a number of UF Falcon tests, as well as other gravity methods such as traditional Falcons and shaking tables, had been performed on whole ore materials such as are described in the material and methods section. These tests consisted of multiple pass scoping tests, as well as a design of experiment matrix for evaluation of parameters impacting a single pass performance, and represent the first time any party has attempted to treat this material via a UF Falcon. Furthermore, the scoping test work revealed that the specific configuration of the upstream feed tank and agitator system could have profound impact on UF Falcon performance, such that a poor configuration could artificially reduce total REO recovery by as much as 20% while simultaneously negatively impacting grade. Thus, a proper configuration was arrived at and used for all follow up testing, including the DOE matrix.

In doing so, it was revealed that the most significant parameters for the UF Falcon were pulp density and grind size, followed by RPM to a lesser degree. Additionally, the multiple pass scoping testing revealed that it was possible to achieve REO recoveries approaching, but not exceeding, 90% while rejecting on the order of 30% Ca. Although this was indicatively highly promising, further gravity separation testing of whole ore materials was abandoned however to prioritize analysis on flotation products due to the even more promising results of parallel flotation studies by Everly and Williams.

Materials and Methods

Molycorp Minerals provided samples of both crushed ore and Mountain Pass cleaner flotation concentrate (MPC) used for this and other parallel studies.

The crushed ore sample consisted of approximately 1 tonne of minus 3/8" material, as packaged collectively in four 55-gallon drums. The whole ore sample was subsequently blended and split using a modified cone and quarter methodology combined with a Jones splitter to yield individual samples of approximately 30 kg. Selected buckets were then subjected to further two stage crushing via a roll crusher at 4.8 mm and 2.4 mm roll spacing. Upon completion of roll crushing, smaller samples on the order of 1 kg, and in some cases 10 kg, each were split via a Jones riffle from the original 30 kg of ore. These individual 1 kg split samples were then subjected to batch grinding in a jar rod mill for either 75, 90, or 120 minutes to yield specific particle size distributions for the respective gravity testing. The 10 kg split samples were subjected to a similar procedure in a larger laboratory rod mill to a target particle size P80 of 50 microns, with the resulting samples subjected to a bulk 10 kg rougher flotation test in a parallel study by Nathaniel Williams.

The MPC sample as received in a 5 gallon bucket was not fully dry, thus it was treated in a drying oven alongside splitting representative samples of approximately 1.5 kg each. Additionally, these individual split samples were subjected to dry cobbing utilizing the Falcon L40's protection screen to remove coarse foreign contamination of road materials, including pebbles of up to half inch diameter, that had accumulated due to storage of the MPC product outside at the mine site. This removal of contamination was also necessary to assure safe testing conditions relative to laboratory equipment limitations.

UF Falcon Concentrator

Stat Ease Design-Expert software was used to generate a two factor Design of Experiments (DOE) matrix for test work performed on the UF Falcon Concentrator. The factors chosen (insert a table somewhere) were RPM (controlled by specifying frequency on the Variac controller attached to the L40 Falcon unit), and feed pulp density. Both parameter ranges were selected to mirror the values used in a prior DOE matrix performed on whole ore material save for the exclusion of the variable of grind time.

The range of pulp densities of 10% solids (by weight) up to 20% solids was based on reported acceptable operating boundary ranges for industrial UF Falcon units. It should be noted that the UF Falcons are reportedly capable of processing as low as 5% solids. However, given that the envisioned flowsheet would entail UF Falcons operating in series with respect to the flow of gravity tailings, the use of 5% solids for the representation of a first stage feed was deemed inappropriately low in this context.

The range of RPM values was dictated by a number of considerations. For the lower bound (930 RPM), this is synonymous with a G-Force of 50 G's, which is the lowest value an industrial unit would be designed for operating at. The selection of 1320 RPM (100 G's) as an upper bound for the DOE matrix was due to anticipated mass pull considerations rather than industrial G-Force values. In general, it is recommended that industrial UF Falcons can yield up to 40-50% mass pull, although reportedly significantly higher values are possible. Prior scoping work performed on ground whole ore materials suggested the mass pull could approach values on the order of 30% to 40% even at comparatively low G Forces of approximately 69 G's. As mass pull was expected to be proportionate to the square of the RPM value (based on an equation proposed by Kroll et Al) (Kroll-Rabotin, Bourgeois, and Climent 2013), it was deemed reasonable at the time to use a comparatively modest G-Force of only 100 G's compared to the lab scale unit's 300 G, and the industrial scale model's 600 G upper operating limits, so as to restrict anticipated mass pulls to recommended ranges.

Additionally, the feed volumetric flowrate, via the use of the tailings flowrate as a proxy indicator, was held to near constant values between 4 and 5 L/min via dynamic tuning of the discharge valve on the feed tank. This was deemed to be a more favorable method for controlling flowrate than the use of a constant valve position given the inclusion of variable pulp densities. The tailings flowrate was monitored via the use of a stop watch, in which a second party would Indicate the passing of 15 or 30 second intervals, coupled with the use of a 5 gallon bucket with 1 liter intervals from 2 L to capacity. Due to the relatively crude precision of the bucket's interval markings, the exact same tailings bucket was used for every test to assure consistency.

For the DOE matrix testing, each test consisted of only a single pass, after which the resulting UF Falcon bowl gravity concentrate was reclaimed into a container and subjected directly to drying in a drying oven for 24 to 36 hours so as to avoid potential loss of fines to filtration. The resulting gravity tailings were subjected to pressure filtration, followed by drying in a drying oven, with both resulting dry products being subsequently subjected to massing and assaying via XRF.

UF Falcon REO Recovery and Grade Maximization Testing

Figure 10:
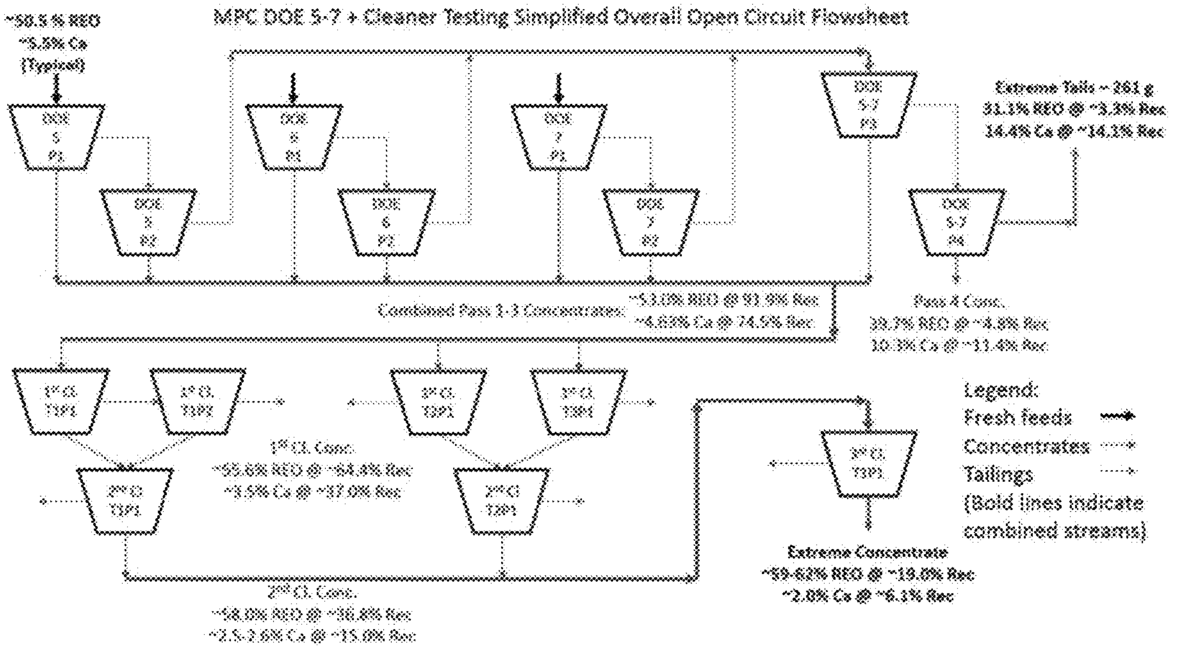
FIG. 10. Overall flowsheet for MPC UF Falcon REO recovery and grade maximization testing programs. The overlaid values represent the estimated selected cumulative performance.

A flowsheet is shown later in FIG. 10 regarding the overall distribution of gravity streams used for both REO recovery and grade maximization testing programs.

With some known exceptions, the pulp density and RPM values used in both the recovery and grade maximization testing were based on the "optimal" values derived from the DOE matrix testing. In testing where multiple stages of UF Falcons in series were evaluated, with the exception of only one test (REO recovery maximization. Pass 4), the prior stages gravity tailings were filtered, dried, assayed, and re-pulped to the original feed pulp density used in the upstream unit(s). Additionally, RPM was deliberately increased in the case of 1st CI Test 2 to yield a G-Force of 200 G's, and in the case of 2nd CI Test 1, the pulp density was unintentionally elevated to 17% solids.

Results and Discussion

Characterization and Mineralogy

Figure 3:
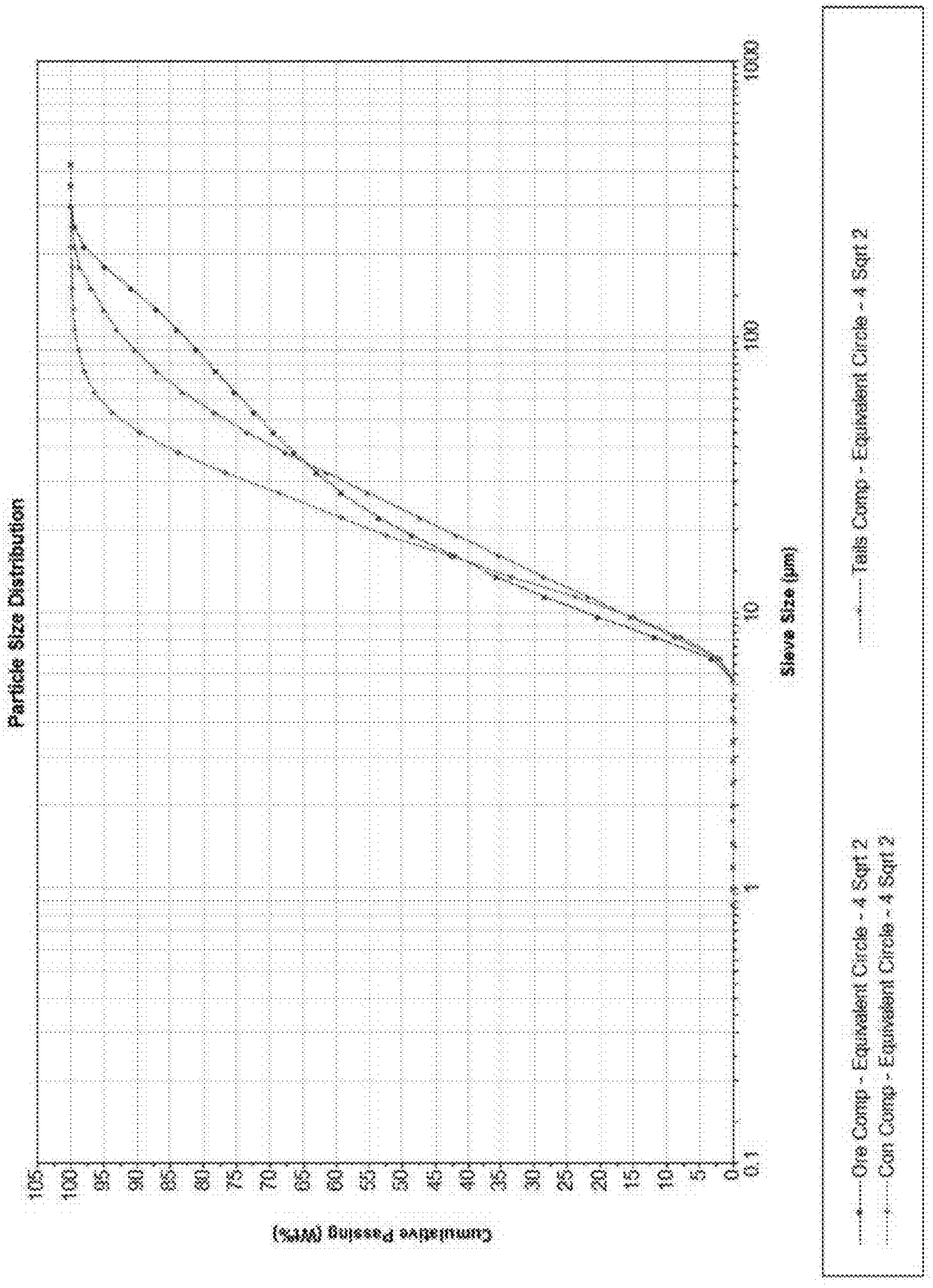
FIG. 3: Particle size distributions of MPC and other Mountain Pass MLA materials

The particle size distributions of the as received MPC material, as well as a sample of recent tailings from Mountain Pass (MP tails) and a single unrepresentative pulverized whole ore specimen, are shown below in FIG. 3. The MPC material exhibits a P80 of approximately 35 microns, while the MP tails are coarser at approximately 55 microns. In either case, this would be considered borderline to excessively fine for treatment by more traditional methods of gravity separation, however it is necessary to grind to such a size in order to achieve liberation of bastnaesite.

The mineralogical composition of the MPC and other materials were determined by Mineral Liberation Analysis (MLA). This was achieved by subjecting the samples to wet sieving at screen sizes of 100, 200, 400, and 500 mesh, from which transverse particle mounts were prepared. The MLA data was obtained by the XBSE method. The MLA determined the modal mineral content of the MPC material sample by size fraction as shown below in Table 1, while an example of a false color image of an unspecified size fraction are shown further below in FIG. 4.

Table 1: Mineral content by size fraction for the MPC material MLA sample. REE-Bearing minerals are in bold. (Consider replacing with an abbreviated table for length.)

Figure 5:
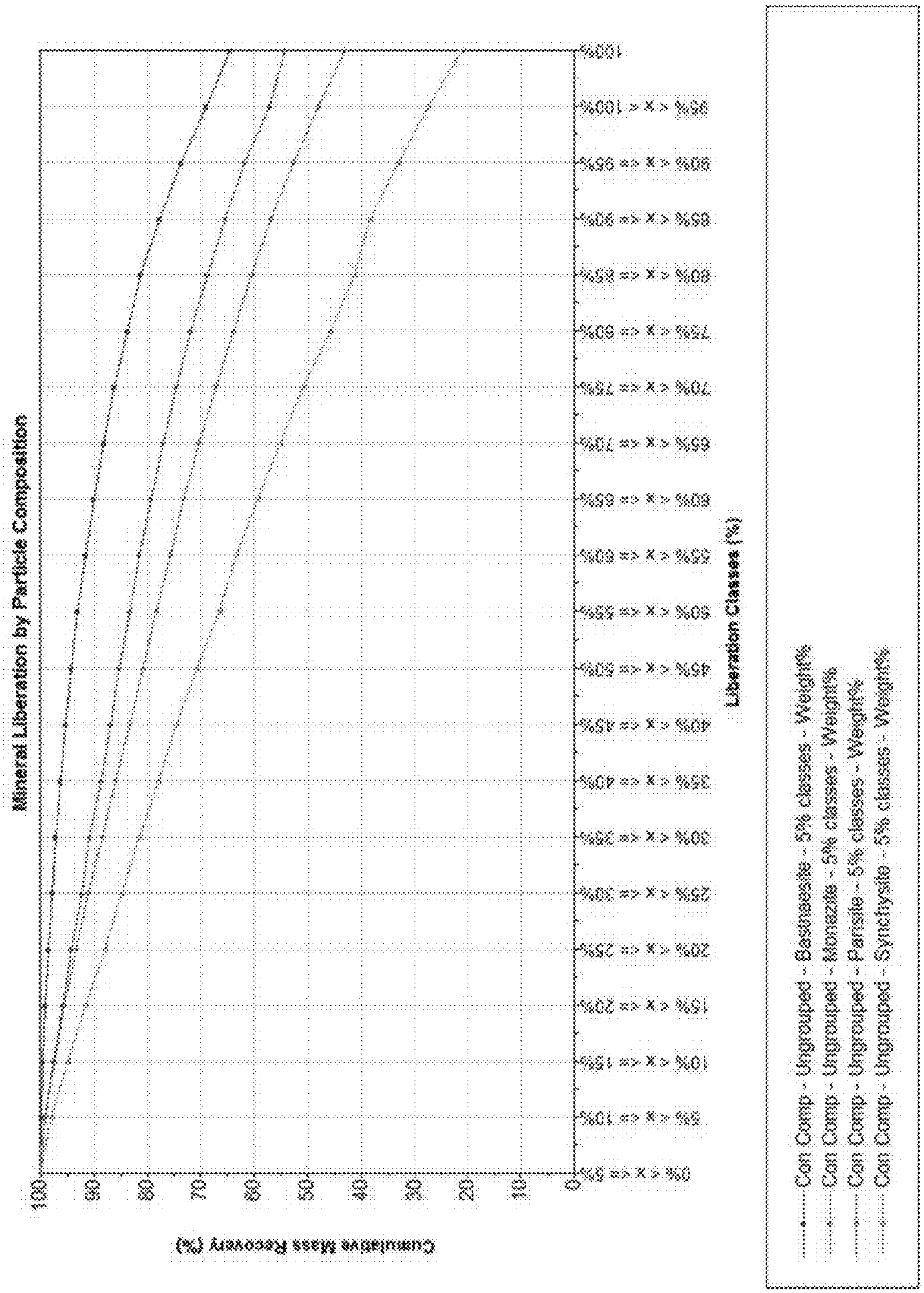
FIG. 5. Mineral liberation by individual REE mineral species in MPC material MLA sample.
Figure 6:
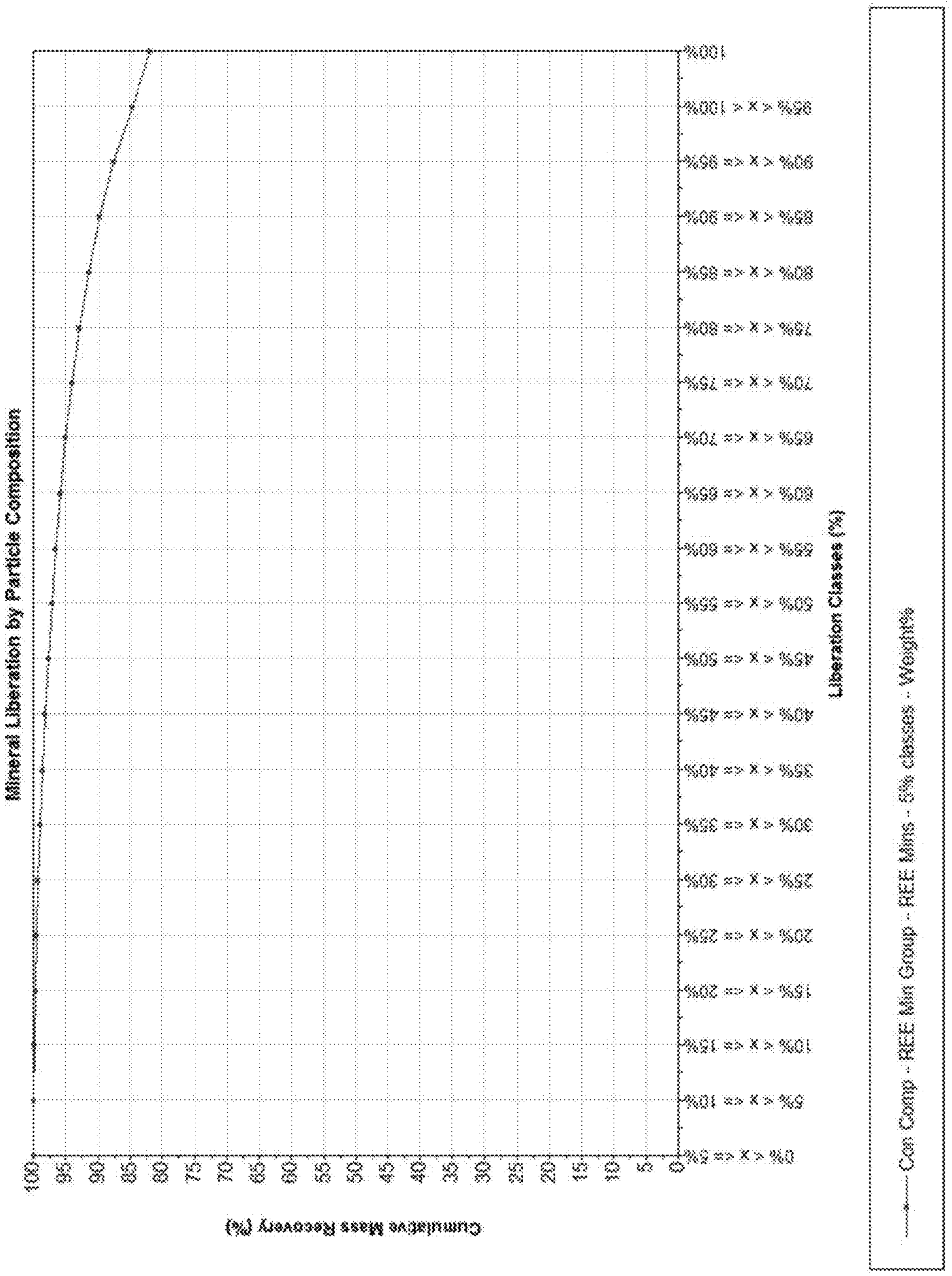
FIG. 6: Mineral liberation by grouped REE minerals in MPC material MLA sample.

Given that there is a high degree of inter-locking between various REE mineral species such as bastnaesite and parasite (an REE and Ca bearing mineral), the liberation profile for individual REE mineral species, as shown below in FIG. 5, is significantly less than the total REE mineral group liberation in the MPC material as shown further below in FIG. 6. When REE minerals are considered as a group, rather than on an individual species basis, this suggests that approximately 85% of the REE minerals as a group are fully liberated in the MPC material MLA sample. This high degree of liberation suggested that no further grinding would initially be needed when treating MPC material via gravity separation within the scope of this study. As gravity performance is often hindered by finer particle sizes, the inclusion of grinding was further deemed not only unnecessary but potentially even detrimental. However, future studies may potentially observe benefits from the inclusion of a regrind circuit at some portion of a multi-stage gravity flowsheet to increase the overall liberation without subjecting the entire mass of material to further size reduction.

UF Falcon DOE Matrix Results

Four responses of the UF Falcon tests performed on MPC material were evaluated: REO grade, REO recovery, Ca grade, and Ca recovery. Of these responses, only those related to Ca were considered statistically significant based on an analysis of variance (ANOVA) in Stat Ease. As the goal was to optimize the parameters by prioritizing rejection of Ca, it was still considered applicable to construct a desirability surface. From this analysis, it was indicated that the proposed optimal parameters were 1320 RPM and 15.1% solids. The results of this DOE testing are shown below in Table 2, including test DOE 7, which was intended to validate the proposed optimal parameters.

TABLE 2

UF Falcon MPC DOE Matrix conditions and results

| Test | Conditions | | Grav Conc Mass | | Grade, % | | Recovery, % | |
|---|---|---|---|---|---|---|---|---|
| (MPC) | RPM | Pulp, wt % | Grams | Rec, % | Ca | REO | Ca | REO |
| DOE 1 | 930 | 20 | 680.4 | 41.13 | 3.63 | 55.26 | 28.90 | 44.51 |
| DOE 2 | 930 | 10 | 603.4 | 37.39 | 4.37 | 53.85 | 28.93 | 39.83 |
| DOE 3 | 1320 | 20 | 633.4 | 38.61 | 3.83 | 53.79 | 24.65 | 41.61 |
| DOE 4 | 1320 | 10 | 546.1 | 36.61 | 3.66 | 55.49 | 24.85 | 39.82 |
| DOE 5 | 1141 | 15 | 612.7 | 39.28 | 3.74 | 54.78 | 26.74 | 42.12 |
| DOE 6 | 1141 | 15 | 630.7 | 40.72 | 3.62 | 55.37 | 27.43 | 44.09 |
| DOE 7 | 1320 | 15.1 | 608.6 | 42.00 | 3.79 | 54.98 | 28.63 | 45.46 |

Similar to prior experiences with the use of a UF Falcon to treat whole ore material, it was apparent that pulp density was a strong factor. Also in line with testing on whole ore material, the use of specifically 10% solids (and likely any lower values) was detrimental to performance by virtually any metric.

UF Falcon REO Recovery Maximization Results

Due to the relatively low recovery obtained during the DOE matrix testing, the Pass 1 gravity tailings from tests 5, 6, and 7 were each individually reprocessed at optimal, or near optimal in one instance, conditions to continue to yield more recovery via the inclusion of subsequent passes in a manner typical of most UF Falcon testing programs. This was aided by the fact that, in light of the strong impact of pulp density compared to RPM, DOE tests 5 and 6 first passes had been coincidentally performed at nearly optimal conditions. The flowsheet used for this recovery maximization testing is shown in the upper half of FIG. 10 shown later in this report.

Given that feed solid masses of approximately 500 grams or smaller becomes increasingly difficult to treat representatively in the lab, it was necessary to combine the Pass 2 tailings from tests 5, 6, and 7 into a single combined feed of approximately 1 kg for pass 3. A fourth and final indicative pass was performed at an unmeasured atypically low pulp density, estimated to be on the order of 9% solids or less, given that the pass 3 tailings had not been filtered and were already borderline at the 500-gram threshold. (it is possible incidentally to quickly estimate the tailings solids mass within +/−50 grams without filtering or drying via knowing the feed mass, the empty mass of the UF bowl, and immediately weighing the bowl and wet concentrate given that it is usually a repeatedly consistent value of somewhere between 70% to 83% solids, the specific value depending on the gravity concentrate's composition.) The resulting 261 grams of pass 4 gravity tailings represented decidedly too little mass to justify even indicative scoping testing.

Figure 7:
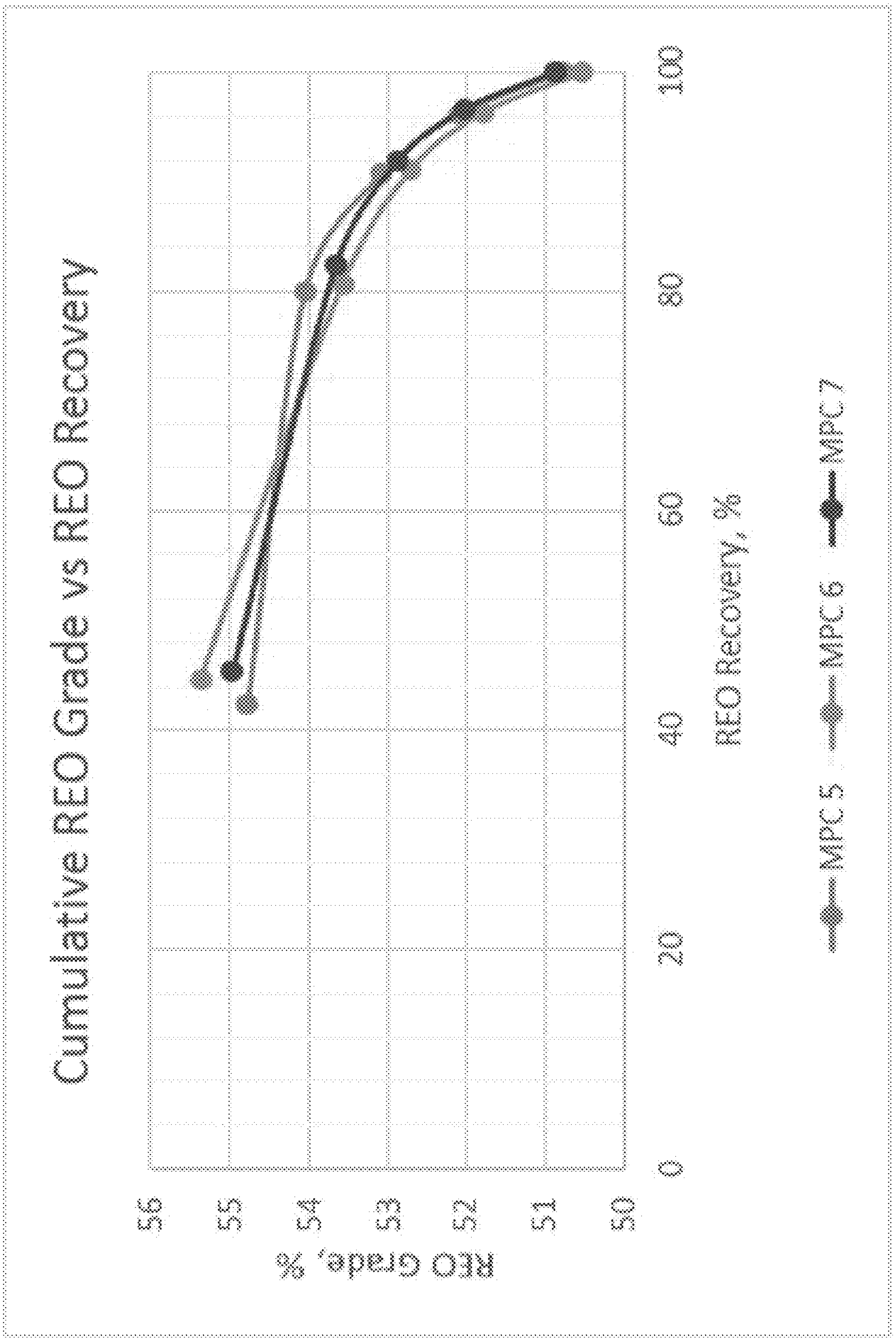
FIG. 7. Cumulative REO Grade/Recovery for MPC UF Falcon Recovery Maximization Testing.
Figure 8:
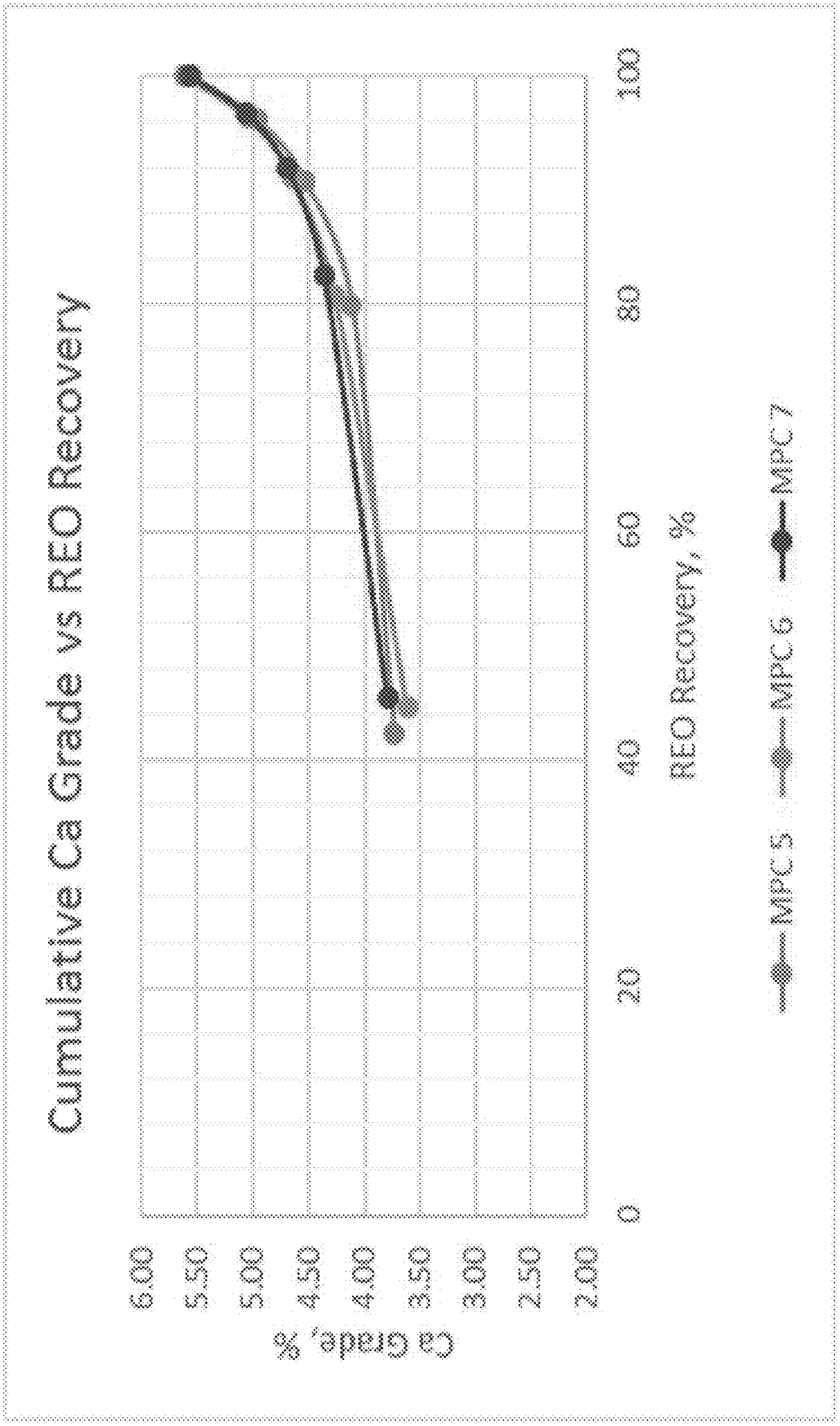
FIG. 8. Cumulative gravity concentrate Ca grade vs REO Recovery for MPC UF Falcon Recovery Maximization Testing.
Figure 9:
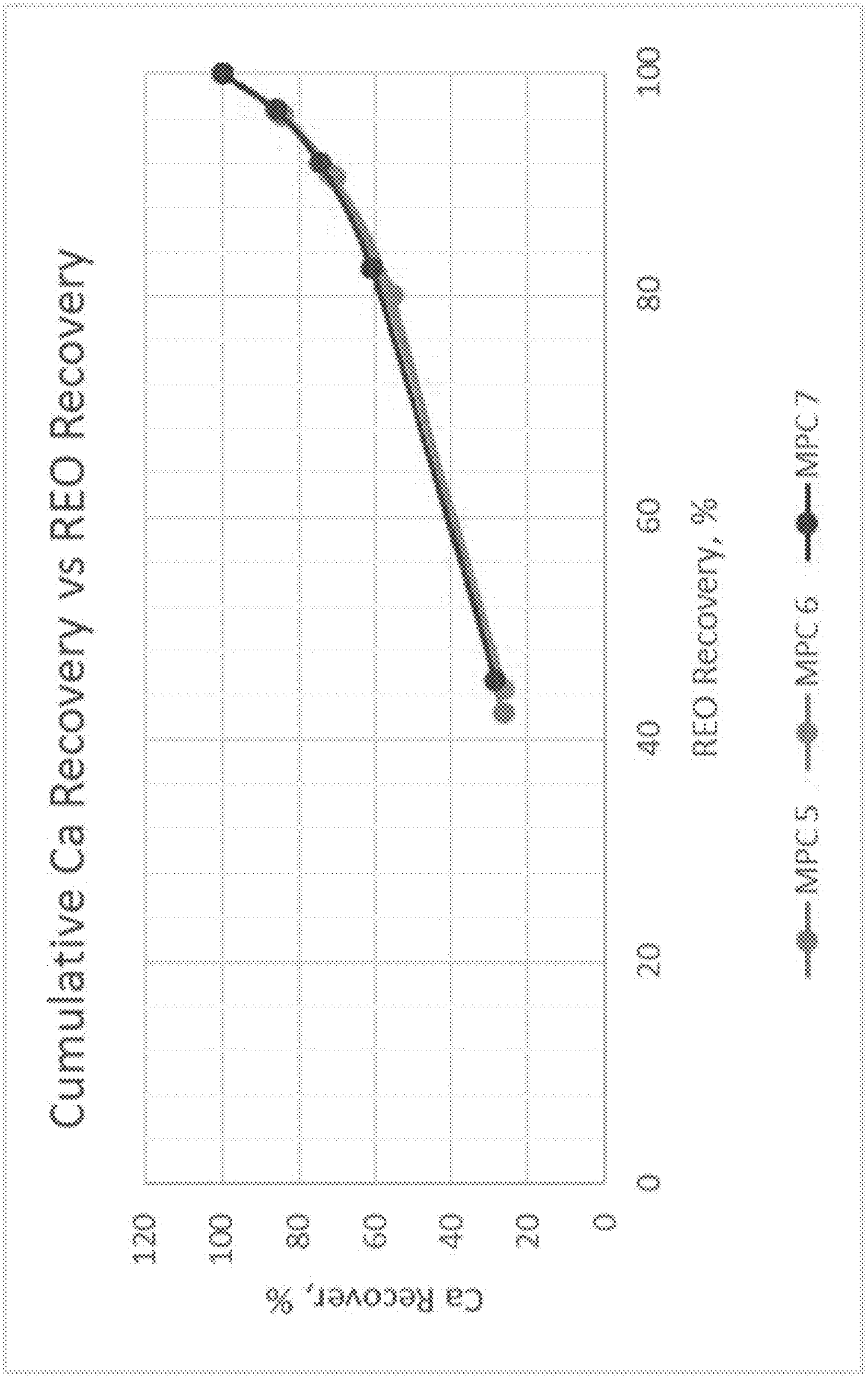
FIG. 9. Cumulative Ca recovery vs REO recovery for MPC UF Falcon Recovery Maximization testing.

The results of this testing are shown below in FIGS. 7 through 9. As can be seen, REO recovery can exceed 90% while still achieving moderate amounts of Ca (and by proxy calcite) rejection, and approach 96% REO at a more modest rejection.

Additionally, the Pass 4 tailings, while distinctly enriched in Ca, were still relatively rich in REO with a grade of 31% REO. It must be emphasized that the inability to continue to recover these REO values was not due to an inherent metallurgical performance, but rather due to material availability in context of equipment limitations.

UF Falcon REO Grade Maximization Results

In an effort to demonstrate the upper limits of possible gravity concentrate grades, additional stages of cleaner gravity UF Falcon separation were performed on the combined pass 1 through 3 concentrates of DOE tests 5, 6, and 7, collectively representing on the order of 91.9% REO recovery. The flowsheet used in this testing program, along with highlights of results, is shown below in FIG. 10.

Given that this testing was performed in open circuit with the goal of maximizing REO grade, rather than in recirculating locked cycle conditions, the recovery values drop considerably with each subsequent stage of cleaner gravity treatment. In industrial conditions, it would be more typical to operating in a locked cycle configuration to improve recovery via retreatment of intermediate stages gravity tailings. Given that the mineralogy suggests up to 85% of the REE minerals were liberated, the possibility exists that these intermediate cleaner stages' gravity concentrate grades could potentially be maintained even at higher overall recovery values.

Although locked cycle testing may be needed to confirm the extent of any such recovery improvements, it was deemed to be difficult as such a test require at least 20%, if not double, the entire supply of MPC material that was available for use in the study to assure a minimum of 6 cycles could be performed.

Williams' UF Falcon Results

In a related parallel study by Nathaniel Williams, utilizing the optimal parameters derived in this study's DOE matrix testing, Williams performed a 3 pass gravity separation test with a UF Falcon on approximately 1.4 kg of an enhanced rougher flotation concentrate sample derived from a 10 kg float test on whole ore material. The moniker of "enhanced" refers to the use of an alternative flotation collector than the traditional fatty acid. The details regarding the composition and rougher flotation recoveries of this enhanced collector are known however they are intentionally withheld from this paper.

The author of this study was present alongside Williams during the aforementioned gravity test work, which made use of the same L40 laboratory Falcon concentrator, UF bowl, feed tank, agitator, and the dedicated 5 gallon tailings bucket (as well as comparable flowrates) as was used in this study following generally the same procedures. It is noteworthy however that this material exhibited a greater propensity for sanding than the MPC material, and was generally speaking more troublesome with respect to slurry handling. Identifying what, if any, and how much of an impact this ultimately had on the results is challenging at best given the existing data sets.

Figure 11:
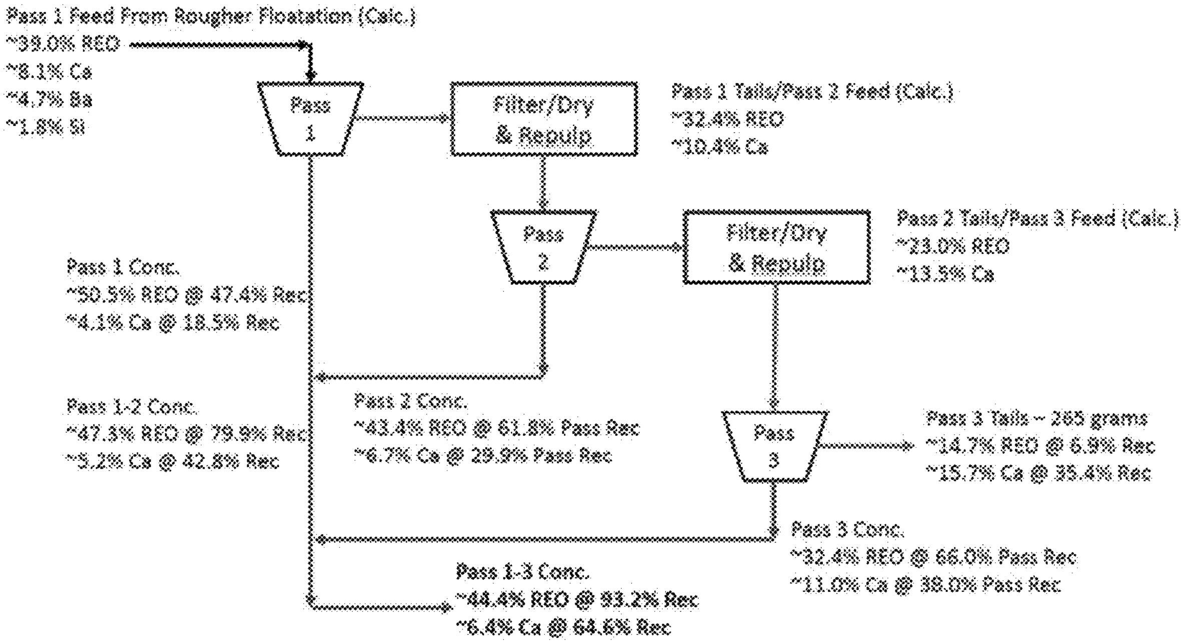
FIG. 11. Flowsheet of Williams' UF Falcon test work on enhanced rougher flotation concentrate.

The flowsheet and results of this test work on both a per pass and cumulative gravity basis are summarized below in FIG. 11.

The use of only 3 passes was due to the constraints of available sample mass, as insufficient gravity tailings mass existed to perform a 4th pass. Williams' results echo those of the REO recovery maximization testing, demonstrating that recoveries of greater than 90% REO can be achieved via the use of UF Falcon while still achieving some degree of calcite rejection. There are a few key differences that hinder direct comparisons beyond the respective upstream flotation recovery values. One of these differences is the presence of a higher amount of barite in Williams' rougher flotation concentrate as opposed to the near absence of barite in the MPC material. As barite is a heavy mineral exhibiting often exhibiting similar gravity recoveries to REO, it can dilute the resulting gravity concentrate's REO grade. Even when bearing in mind this and other differences in respective feed grades, on a per pass basis Williams' material indicatively exhibited a greater degree of selectivity against calcite than the MPC material.

Williams' study did not include any further stages of cleaner gravity separation, thus a comparison to the MPC REO grade maximization testing is not possible in the absence of such data.

Conclusions

The use of an UF Falcon to beneficiate rougher or cleaner flotation bastnaesite concentrates represents a technically viable option for achieving partial to significant rejection of carbonate gangue, such that it can be used in a complementary manner with an existing or modified flotation circuit.

Ultra-Fine Centrifugal Concentration of Bastnaesite Ore

Historically, the ability to effectively separate carbonate gangue from bastnaesite via flotation has frequently proven to be challenging without sacrificing significant REO grade or recovery. However, in light of the fact that the rare earth bearing minerals often exhibit higher specific gravities than the carbonate gangue, the possibility exists that the use of gravity separation could be used to achieve such a selective separation. This however is complicated by the fact that, in cases such as this study when the liberation size is finer than 50 microns, most traditional gravity separation methods become increasingly challenging. The purposes of this study is to determine the applicability of centrifugal concentrators to beneficiate Ultra-Fine (UF) bastnaesite and calcite bearing flotation feed material. Via the use of a UF Falcon, it was possible to achieve initial gravity REO recoveries approaching the upper 80% range while rejecting on the order of 30% of the total calcium. In terms of purely REO recovery, this represents a significant improvement over results obtained via a traditional Falcon in previously reported studies.

Ultra-Fine Falcon Concentrators

Figure 12:
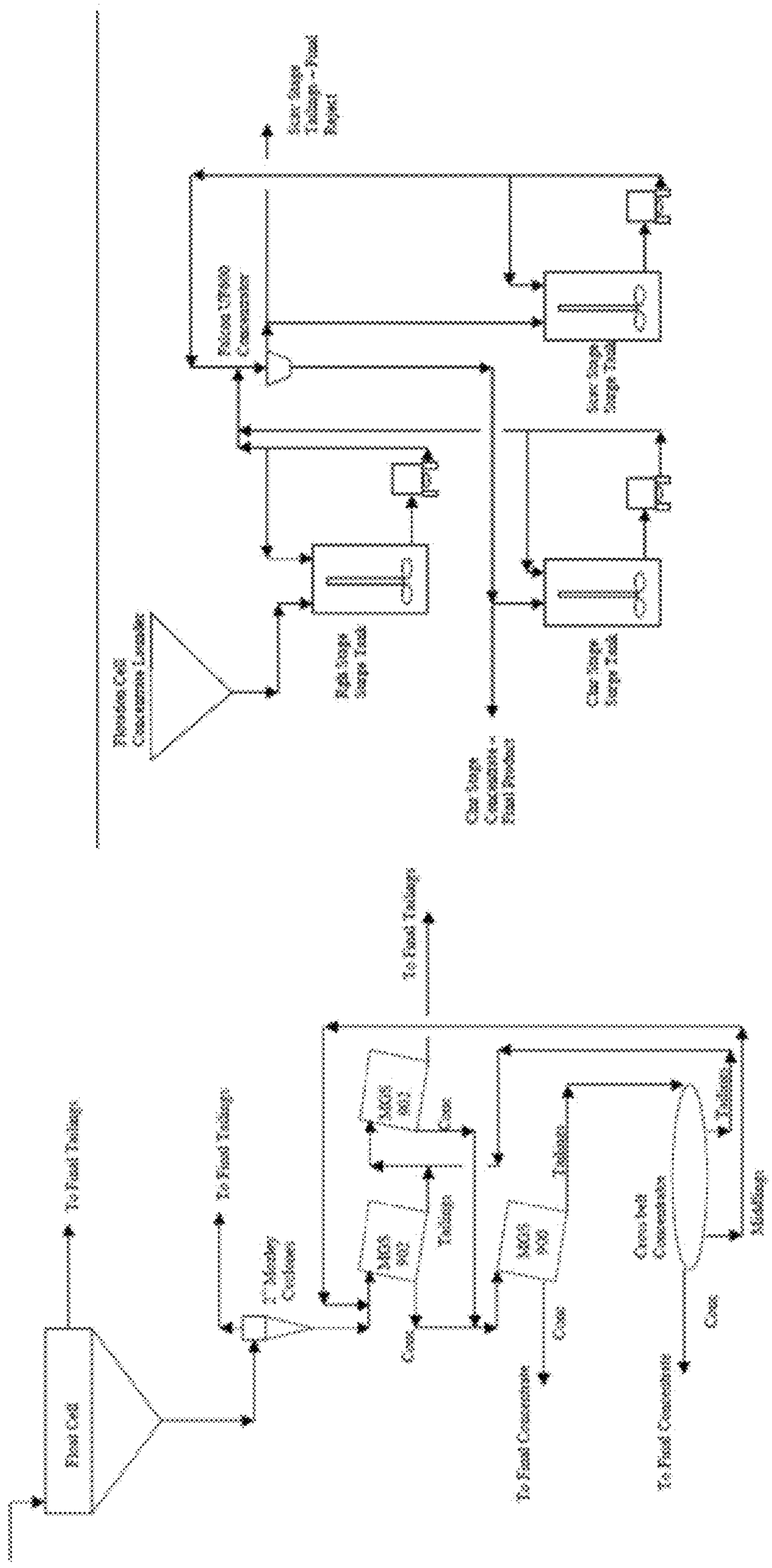
FIG. 12. Original TANCO tantalum gravity circuit (left) and subsequent replacement with a UF Falcon circuit (right).

The development of the Ultra-Fine (UF) Falcon concentrator started in earnest in 2003 in order to better treat a tantalum flotation concentrate in light of a change to a finer mineralogy. To this end, the first industrial UF Falcon was commissioned on April 2005, making it a relatively young technology at the time of writing compared to Knelson and traditional Falcon centrifugal concentrators. In its debut, a single UF Falcon was able to outperform and replace the entire previous gravity circuit consisting of Mozely gravity separators and cyclones as is pictured below in FIG. 12.

Figure 13:
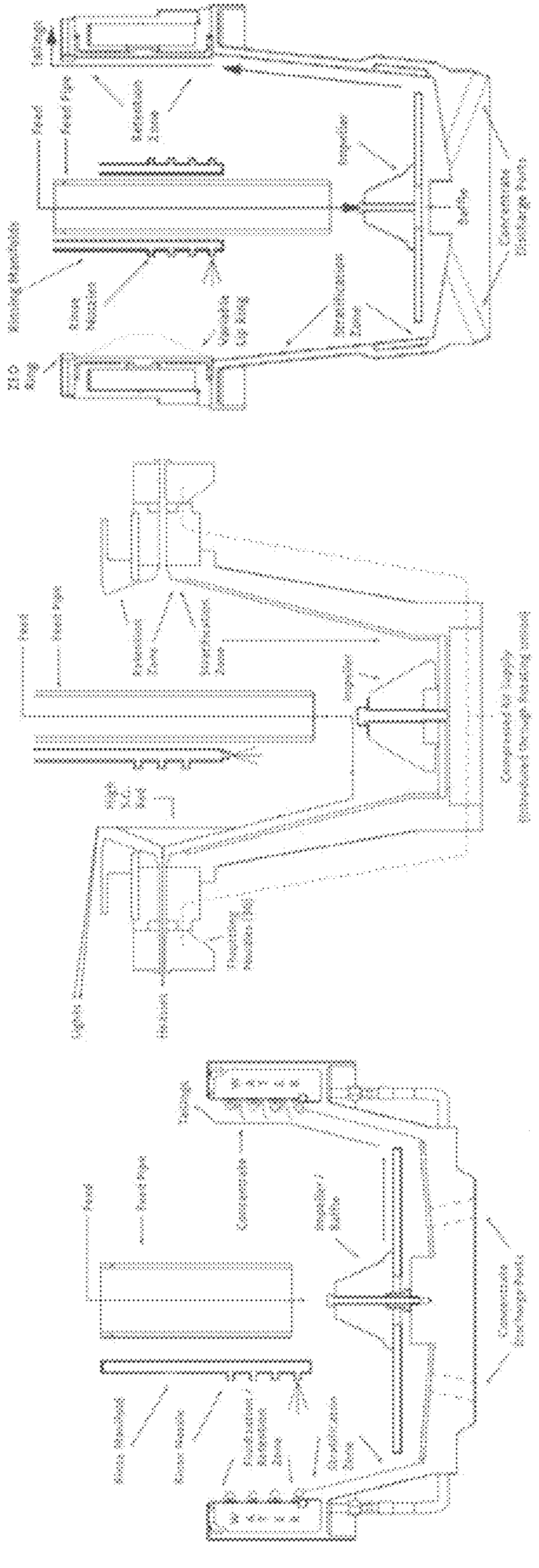
FIG. 13. Cross sections of bowl of SB (left), continuous (center) and UF Falcon (right). (Sepro brochures)

UF Falcons operate on a similar principal to other centrifugal concentrators, namely in the use of a spinning bowl to induce stratification of light and heavy minerals, however there are a number of differences in terms of the unit itself. Most significantly, as the name suggests, the UF Falcon is specifically intended to treat finer feeds of anywhere from 75 to 3 microns. Another consequence of the use of such comparatively fine feeds is that the UF Falcon, including at lab scale, utilizes no fluidization water. Additionally, it is capable of an even higher G-Force than traditional continuous Falcons, with a maximum value of up to 600 G's. Lastly, the UF bowl is nearly vertical, with the gravity concentrate retention zone consisting of a single variable lip ring in the case of industrial scale units. A side by side comparison of bowl cross sections of the industrial SB, continuous, and UF Falcons are shown below in FIG. 13.

Due to the bowl configuration in the UF Falcon, it is only available as a semi-batch unit, however, this also enables it to achieve, should the user so desire, a wide range of mass pulls reportedly up to 90% (see Sepro website), with more typically reported upper bounds of 40%.

The drawbacks, compared to other centrifugal concentrators, are that the UF Falcon exhibits a comparatively high unit power consumption per ton of solids. Additionally, as of the time of writing, the largest commercially available model has a typical maximum throughput of only 2 tph solids with an installed motor of 60 HP. The ability to build a larger unit is reportedly limited by mechanical considerations necessary to induce 600 G's, thus for the foreseeable near future the use of UF Falcons is practically restricted to treating low throughput process streams such as flotation concentrates.

Whole Ore UF Falcon Testing

For contextual purposes, it should be noted that prior to gravity testing of flotation concentrates, a number of UF Falcon tests, as well as other gravity methods such as traditional Falcons and shaking tables, had been performed on whole ore materials such as are described in the material and methods section. These tests consisted of multiple pass scoping tests, as well as a design of experiment matrix for evaluation of parameters impacting a single pass performance, and represent the first time any party has attempted to treat this material via a UF Falcon. Furthermore, the scoping test work revealed that the specific configuration of the upstream feed tank and agitator system could have profound impact on UF Falcon performance, such that a poor configuration could artificially reduce total REO recovery by as much as 20% while simultaneously negatively impacting grade. Thus, a proper configuration was arrived at and used for all follow up testing, including the DOE matrix.

In doing so, it was revealed that the most significant parameters for the UF Falcon were pulp density and grind size, followed by RPM to a lesser degree. Additionally, the multiple pass scoping testing revealed that it was possible to achieve REO recoveries approaching, but not exceeding, 90% while rejecting on the order of 30% Ca. Although this was indicatively highly promising, further gravity separation testing of whole ore materials was abandoned however to prioritize analysis on flotation products due to the even more promising results of parallel flotation studies by Everly and Williams.

Materials and Methods

Molycorp Minerals provided samples of both crushed ore and Mountain Pass cleaner flotation concentrate (MPC) used for this and other parallel studies.

The crushed ore sample consisted of approximately 1 tonne of minus ⅜" material, as packaged collectively in four 55-gallon drums. The whole ore sample was subsequently blended and split using a modified cone and quarter methodology combined with a Jones splitter to yield individual samples of approximately 30 kg. Selected buckets were then subjected to further two stage crushing via a roll crusher at 4.8 mm and 2.4 mm roll spacing. Upon completion of roll crushing, smaller samples on the order of 1 kg, and in some cases 10 kg, each were split via a Jones riffle from the original 30 kg of ore. These individual 1 kg split samples were then subjected to batch grinding in a jar rod mill for either 75, 90, or 120 minutes to yield specific particle size distributions for the respective gravity testing. The 10 kg split samples were subjected to a similar procedure in a larger laboratory rod mill to a target particle size P80 of 50 microns, with the resulting samples subjected to a bulk 10 kg rougher flotation test in a parallel study by Nathaniel Williams.

UF Falcon Scoping Testing

Four different scoping tests were performed on whole ore material, each of which utilizing different parameters and or upstream ancillary equipment. The purpose of this testing was ultimately three fold; first, to compare against historic testwork performed with a traditional Falcon. Secondly, the tests were performed for multiple passes so as to maximize REO recovery, and lastly, to determine a proper feed tank and agitator configurations.

UF Falcon Concentrator Doe Testing

Stat Ease Design-Expert 10 software was used to generate a two factor Design of Experiments (DOE) matrix for test work performed on the UF Falcon Concentrator. The factors chosen (insert a table somewhere) were RPM (controlled by specifying frequency on the Variac controller attached to the L40 Falcon unit), feed pulp density, and grind time.

The range of pulp densities of 10% solids (by weight) up to 20% solids was based on reported acceptable operating boundary ranges for industrial UF Falcon units. It should be noted that the UF Falcons are reportedly capable of processing as low as 5% solids. However, given that the envisioned flowsheet would entail UF Falcons operating in series with respect to the flow of gravity tailings, the use of 5% solids for the representation of a first stage feed was deemed inappropriately low in this context.

The range of RPM values was dictated by a number of considerations. For the lower bound (930 RPM), this is synonymous with a G-Force of 50 G's, which is the lowest value an industrial unit would be designed for operating at. The selection of 1320 RPM (100 G's) as an upper bound for the DOE matrix was due to anticipated mass pull considerations rather than industrial G-Force values. In general, it is recommended that industrial UF Falcons can yield up to 40-50% mass pull, although reportedly significantly higher values are possible. Prior scoping work performed on ground whole ore materials suggested the mass pull could approach values on the order of 30% to 40% even at comparatively low G Forces of approximately 69 G's. As mass pull was expected to be proportionate to the square of the RPM value (based on an equation proposed by Kroll et Al) (Kroll-Rabotin, Bourgeois, and Climent 2013), it was deemed reasonable at the time to use a comparatively modest G-Force of only 100 G's compared to the lab scale unit's 300 G. and the industrial scale model's 600 G upper operating limits, so as to restrict anticipated mass pulls to recommended ranges.

Grind time was varied as a proxy for varying the feed P80, with target P80's of 50, 40, and 30 microns corresponding to 75, 90, and 120 minutes respectively.

Additionally, the feed volumetric flowrate, via the use of the tailings flowrate as a proxy indicator, was held to near constant values between 4 and 5/min via dynamic tuning of the discharge valve on the feed tank. This was deemed to be a more favorable method for controlling flowrate than the use of a constant valve position given the inclusion of variable pulp densities. The tailings flowrate was monitored via the use of a stop watch, in which a second party would indicate the passing of 15 or 30 second intervals, coupled with the use of a 5 gallon bucket with 1 liter intervals from 2 L to capacity. Due to the relatively crude precision of the bucket's interval markings, the exact same tailings bucket was used for every test to assure consistency.

For the DOE matrix testing, each test consisted of only a single pass, after which the resulting UF Falcon bowl gravity concentrate was reclaimed into a container and subjected directly to drying in a drying oven for 24 to 36 hours so as to avoid potential loss of fines to filtration. The resulting gravity tailings were subjected to pressure filtration, followed by drying in a drying oven, with both resulting dry products being subsequently subjected to massing and assaying via XRF.

Results and Discussion

Characterization and Mineralogy

Figure 14:
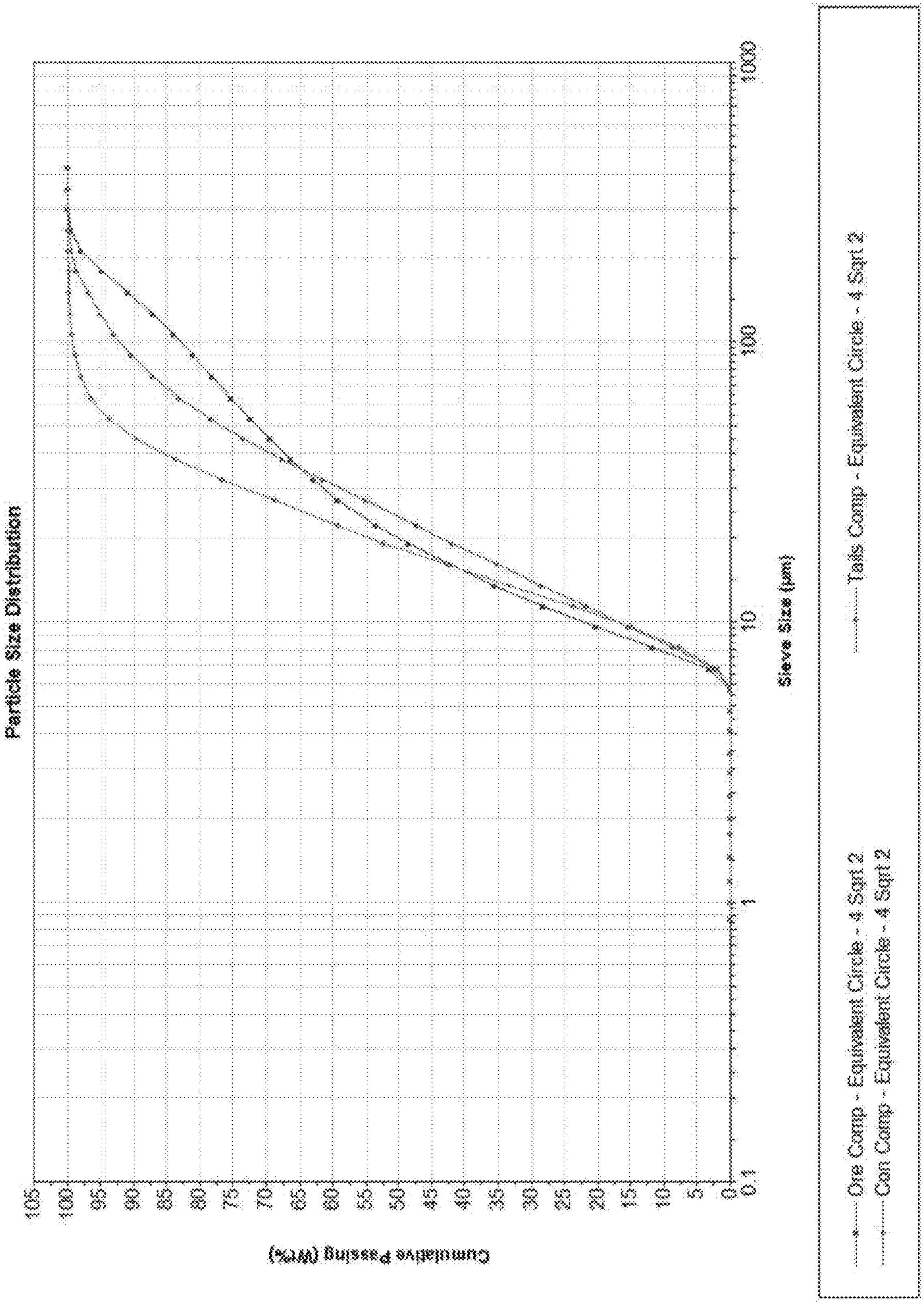
FIG. 14: Particle size distributions of MPC and other Mountain Pass MLA materials.
Figure 15:
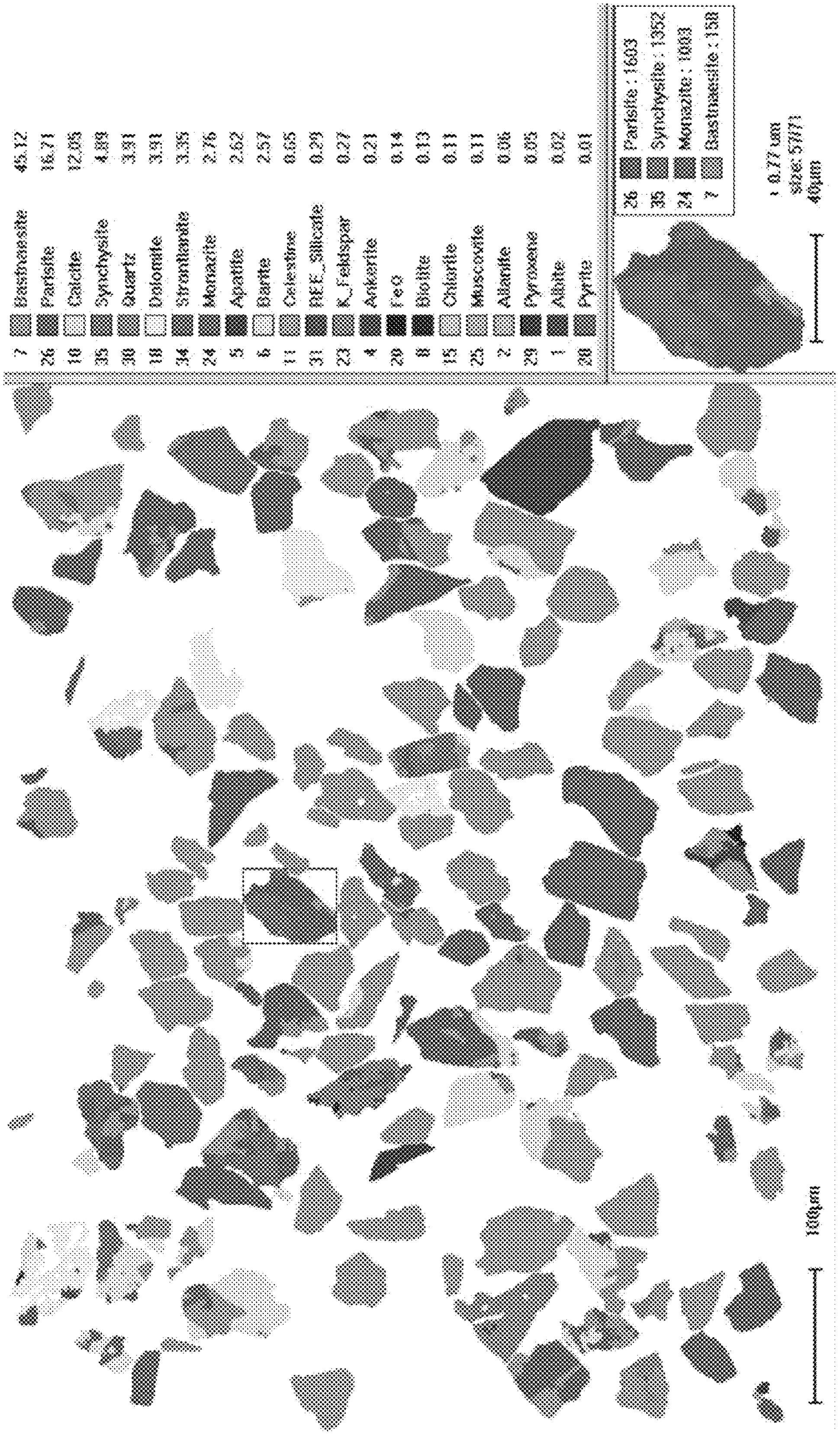
FIG. 15: False-color Image from MLA of MPC material. Values represent surface are percentages.

The particle size distributions of the as received MPC material, as well as a sample of recent tailings from Mountain Pass (MP tails) and a single unrepresentative pulverized whole ore specimen, are shown below in FIG. 14. The MPC material exhibits a P80 of approximately 35 microns, while the MP tails are coarser at approximately 55 microns. In either case, this would be considered borderline to excessively fine for treatment by more traditional methods of gravity separation, however it is necessary to grind to such a size in order to achieve liberation of bastnaesite.

The mineralogical composition of the MPC and other materials were determined by Mineral Liberation Analysis (MLA). This was achieved by subjecting the samples to wet sieving at screen sizes of 100, 200, 400, and 500 mesh, from which transverse particle mounts were prepared. The MLA data was obtained by the XBSE method. The MLA determined the modal mineral content of the MPC material sample by size fraction as shown below in Table 3, while an example of a false color image of an unspecified size fraction are shown further below in FIG. 14.

Table 3: Mineral content by size fraction for the MPC material MLA sample. REE-Bearing minerals are in bold. (Consider replacing with an abbreviated table for length.)

Figure 16:
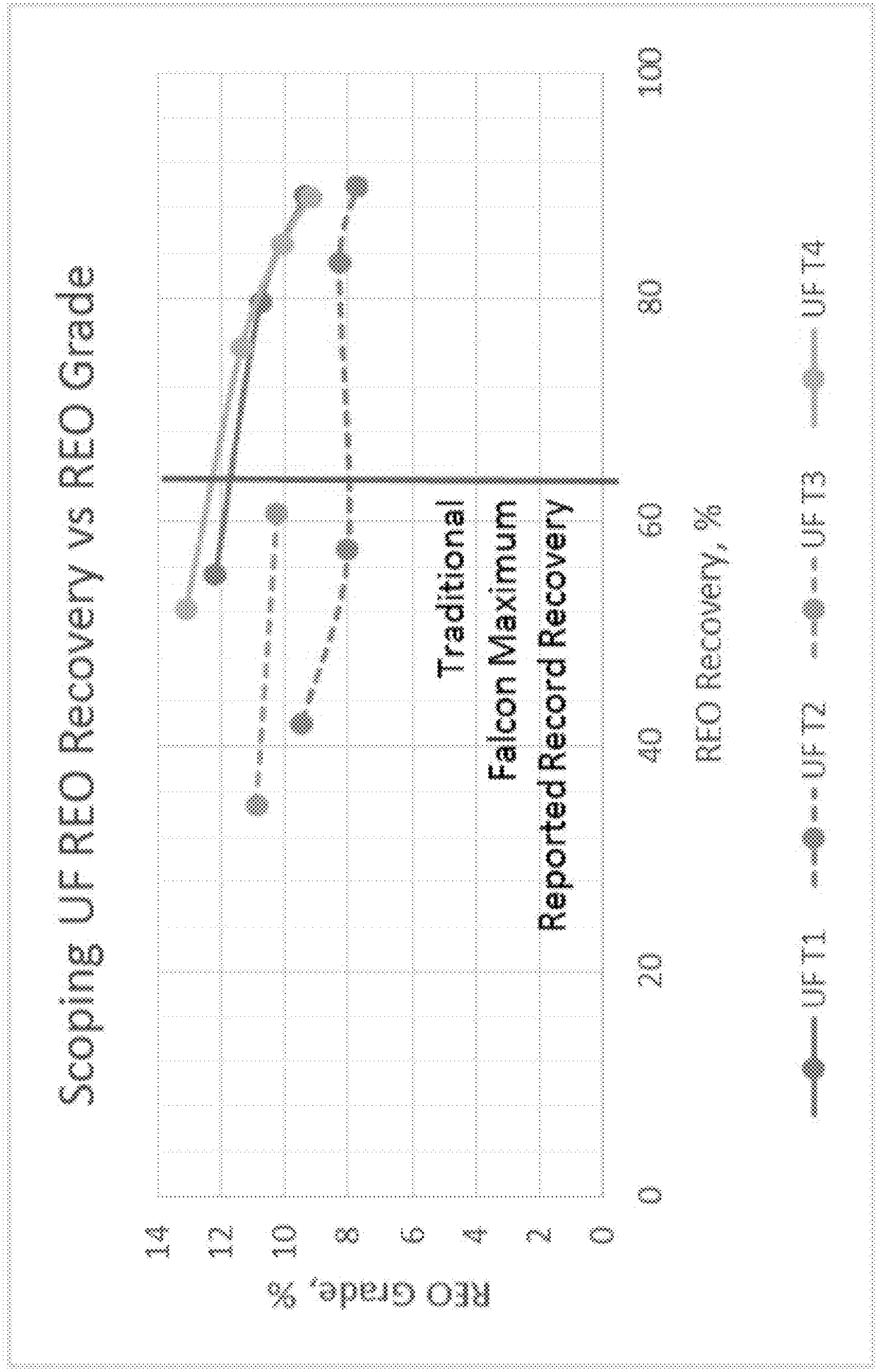
FIG. 16: Scoping UF Falcon REO Grade/Recovery Results. Tests shown with dashed lines indicate artificially poor performance due to suboptimal ancillary equipment. Overlaid is the previous REO recovery record set by Schriner (2015).
Figure 17:
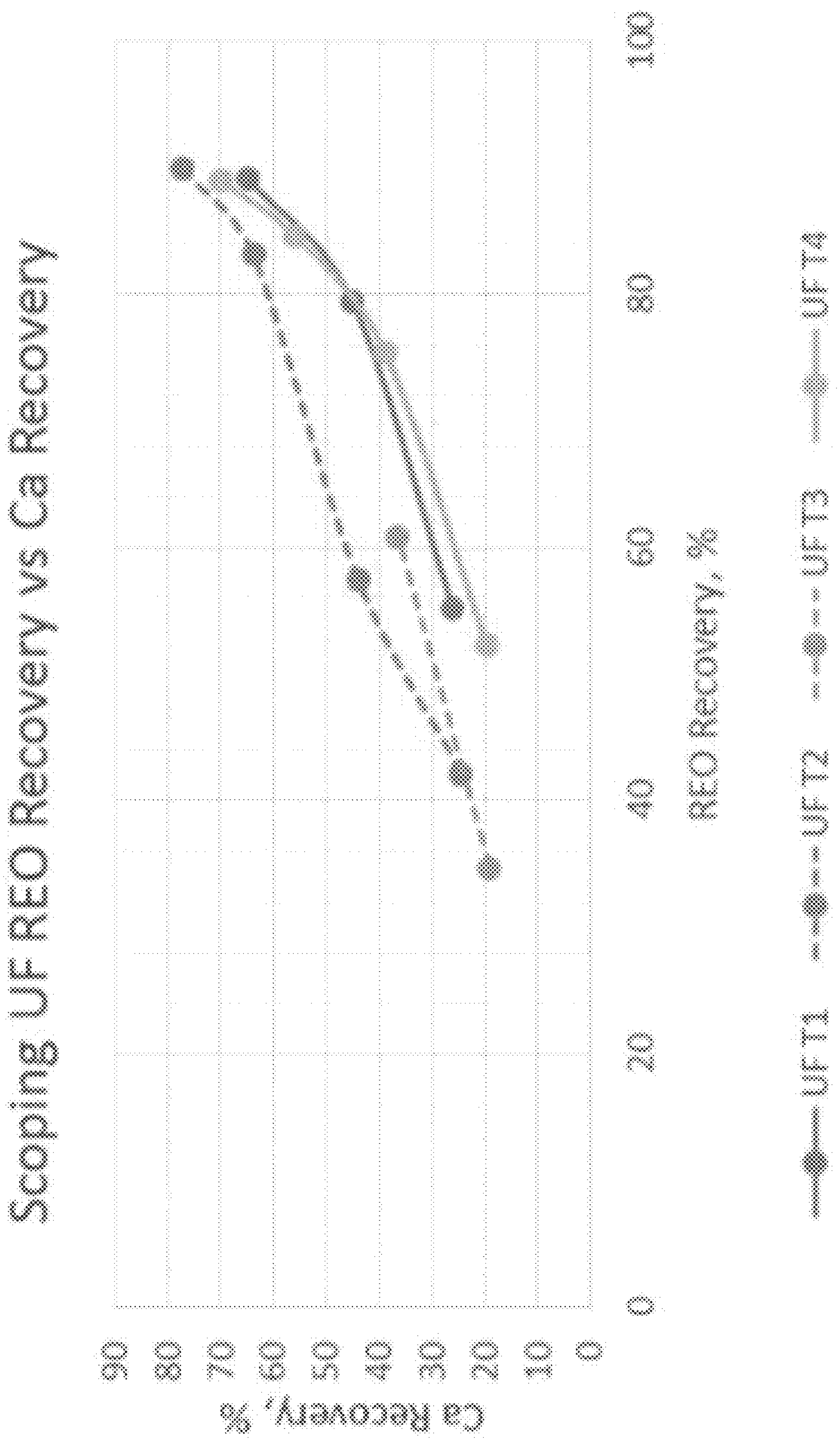
FIG. 17—Scoping UF Falcon testing Ca recovery vs REO recovery.

Given that there is a high degree of inter-locking between various REE mineral species such as bastnaesite and parasite (an REE and Ca bearing mineral), the liberation profile for individual REE mineral species, as shown below in FIG. 16, is significantly less than the total REE mineral group liberation in the MPC material as shown further below in FIG. 17. When REE minerals are considered as a group, rather than on an individual species basis, this suggests that approximately 85% of the REE minerals as a group are fully liberated in the MPC material MLA sample. This high degree of liberation suggested that no further grinding would initially be needed when treating MPC material via gravity separation within the scope of this study. As gravity performance is often hindered by finer particle sizes, the inclusion of grinding was further deemed not only unnecessary but potentially even detrimental. However, future studies may potentially observe benefits from the inclusion of a regrind circuit at some portion of a multi-stage gravity flowsheet to increase the overall liberation without subjecting the entire mass of material to further size reduction.

UF Falcon Scoping Results

Figure 18:
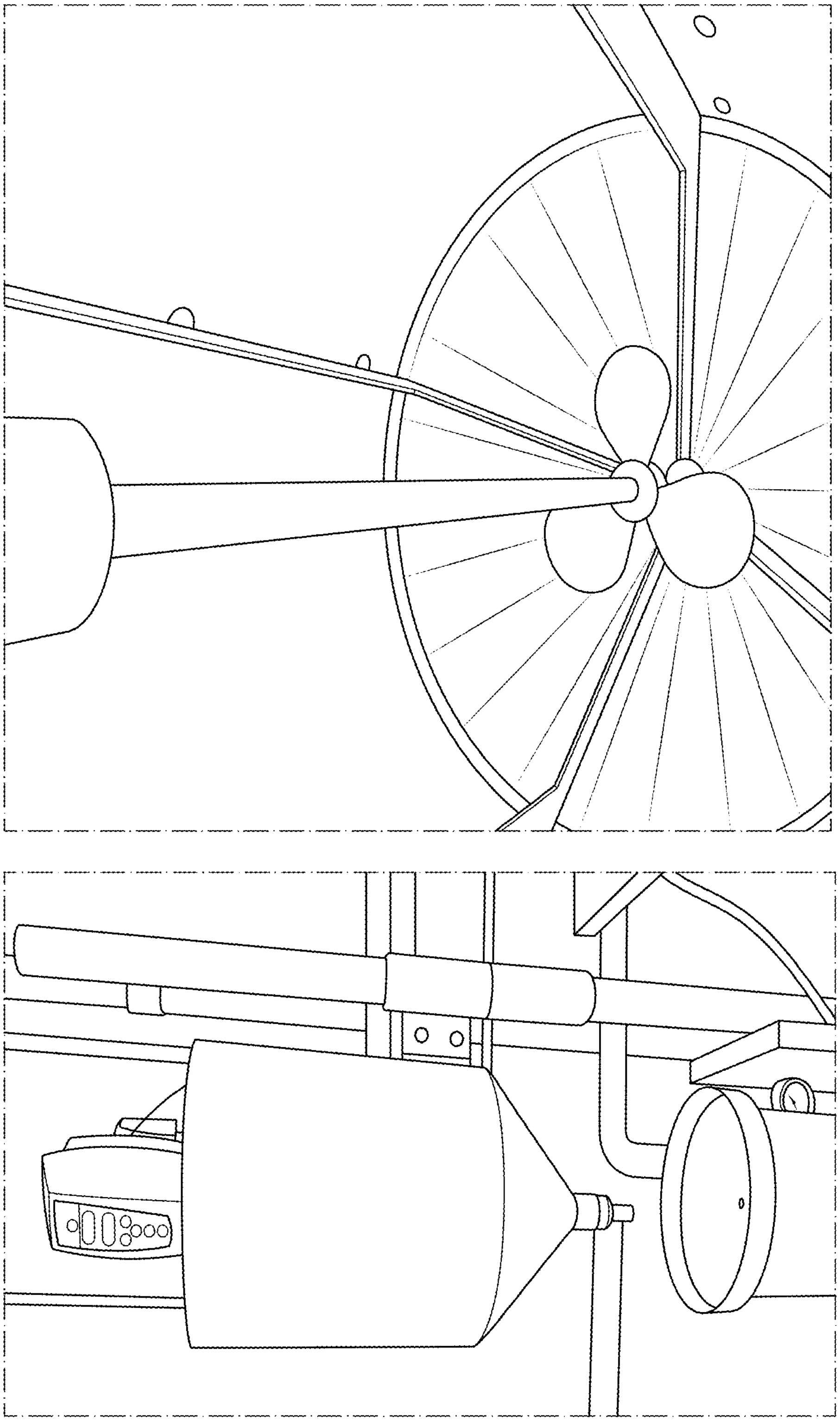
FIG. 18: Feed tank, agitator, and laboratory Falcon optimal configuration as seen from the exterior (left) and interior (right).
Figure 19:
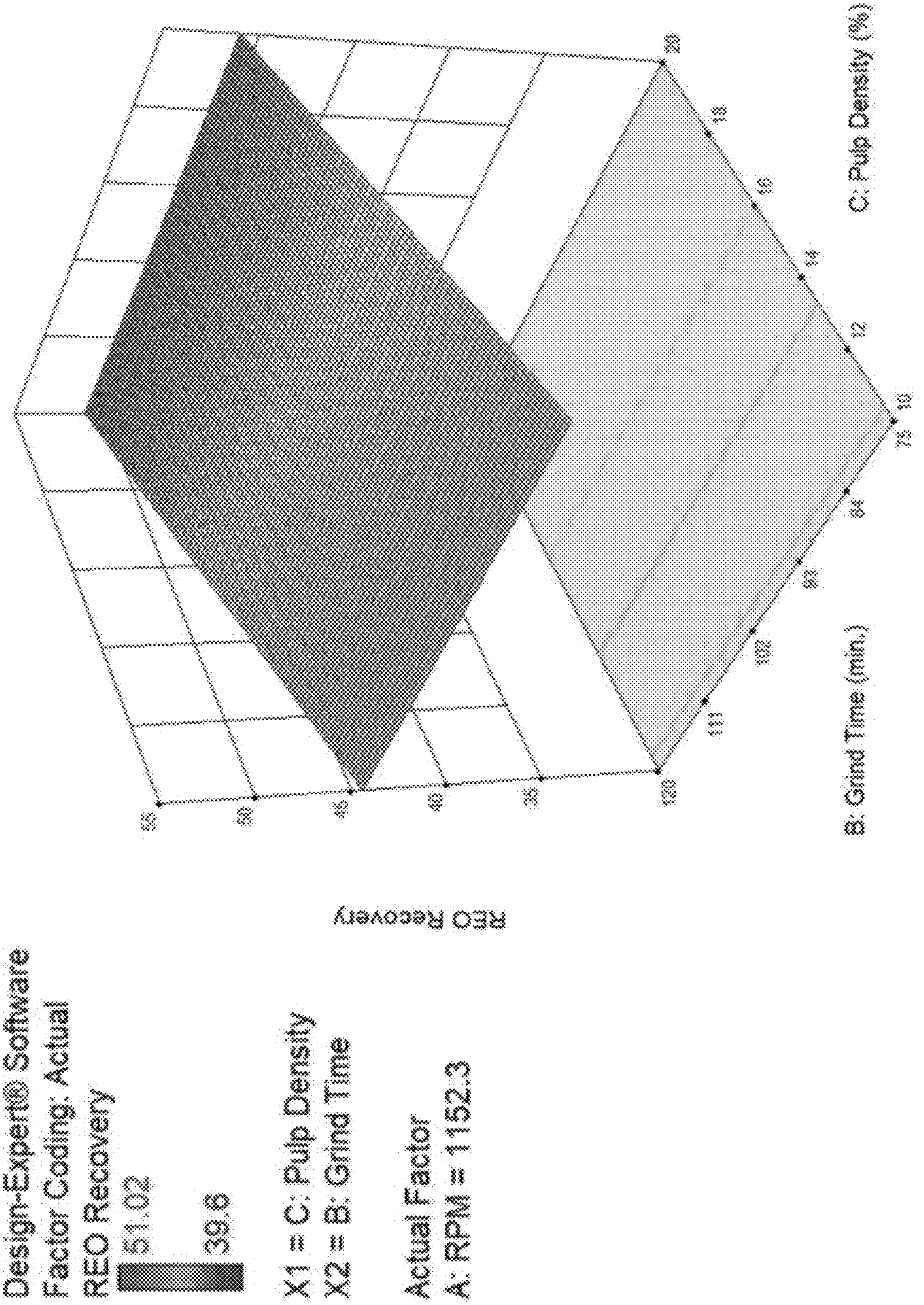
FIG. 19: Predicted REO Recovery for Pass 1 UF Falcon tests.

The first of the scoping tests confirmed that, in a single pass albeit at lower RPM's, the laboratory UF Falcon was capable of matching the results of 4 cumulative passes with a traditional Falcon. With the inclusion of a second pass, the first scoping test had already broken the previously reported maximum achieved REO recovery via a traditional Falcon, and by the third pass was approaching 90% REO recovery as is shown below in FIG. 18. Additionally, the fact this was done with any degree of selectivity against calcium, as shown in FIG. 19, in spite of no prior optimization was also considered favorable. These results were promising enough to justify a complete immediate shift in focus in favor of further UF Falcon testing.

The second scoping test revealed that the nearly flat bottomed, unbaffled feed tank would not only be problematic to work with, but also that in the event of issues, that the resulting gravity performance could artificially suffer immensely. The third test was performed with a new conical feed tank, keeping the same agitator as before. This revealed the agitator was both no longer the proper length, and that it was severely underpowered, having a similarly negative impact as was observed in the second scoping test. Thus, the fourth and final scoping test was performed with an upgraded agitator, the results of which, as shown below in FIGS. 18 and 19, appeared to resolve all issues. This configuration, as photographed in FIG. 20, was preserved for the later DOE matrix testing. It is strongly recommended that any reader considering performing such testing utilize a similar setup, as this enables testing of a wider range of pulp densities.

UF Falcon DOE Matrix Results—Update for Whole Ore

Four responses of the UF Falcon tests performed on MPC material were evaluated: REO grade, REO recovery, Ca grade, and REO/Ca recovery. Of these responses, all of which were considered statistically significant based on an analysis of variance (ANOVA) in Stat Ease 10. As the goal was to optimize the parameters by prioritizing recovery of REO, it was considered applicable to construct a desirability surface, based on predictive responses such as is pictured below in FIG. 8.

From this analysis, it was indicated that the proposed optimal parameters were 1XXX RPM, 17% solids, and a 120 minute grind. The results of this DOE testing are shown below in Table 4. However, due to significant parallel developments that justified a further abrupt shift in focus to the use of gravity on flotation concentrates rather than flotation feed, the optimal parameters were not explicitly tested.

TABLE 4

UF Falcon Whole Ore DOE Matrix conditions and results

| | Conditions | | | Grade, % | | Recovery, % | |
|---|---|---|---|---|---|---|---|
| Test | RPM | Grind, min | Pulp, wt % | Ca | REO | Ca | REO |
| 1 | 930 | 75 | 20 | 8.15 | 12.50 | 21.44 | 50.72 |
| 2 | 930 | 120 | 20 | 7.63 | 12.36 | 20.17 | 50.80 |
| 3 | 930 | 120 | 10 | 7.42 | 13.74 | 17.52 | 49.09 |
| 4 | 930 | 75 | 10 | 8.75 | 11.04 | 21.65 | 44.00 |
| 5 | 1320 | 75 | 10 | 8.44 | 11.63 | 17.93 | 39.60 |
| 6 | 1320 | 120 | 20 | 7.57 | 13.80 | 18.75 | 49.86 |
| 7 | 1320 | 75 | 20 | 7.99 | 12.77 | 21.54 | 48.88 |
| 8 | 1320 | 120 | 10 | 7.70 | 13.49 | 15.87 | 41.30 |
| 9 | 1141 | 90 | 15 | 7.67 | 12.97 | 18.32 | 47.20 |
| 10 | 1141 | 90 | 15 | 7.19 | 13.72 | 17.58 | 52.01 |

Similar to later experiences with the use of a UF Falcon to treat various flotation concentrates, it was apparent that pulp density was a strong factor. Also in line with later testing on flotation concentrates, the use of specifically 10% solids (and likely any lower values) was detrimental to performance by virtually any metric.

Conclusions

The use of an UF Falcon to beneficiate bastnaesite ore represents a technically viable option for achieving partial rejection of carbonate gangue, such that it can be used in a complementary manner upstream of an existing or modified flotation circuit.

Flotation of Bastnaesite Ore Using Novel Collectors by: Dylan Everly, Dr. Corby Anderson Interest in rare earth elements has increased due to their distinct properties and new applications. China currently has a monopoly on rare earth production due to the lack of an economically viable processes used outside of China. Bastnaesite, a rare earth fluorocarbonate, is one of the most common minerals containing rare earth elements, which is mostly comprised of cerium and other light rare earth elements. The objective of this research is to find a novel collector for the beneficiation of bastnaesite through froth flotation experiments to increase the grade and recovery of rare earth oxides while rejecting the major gangue minerals. Microflotation and rougher bench flotation studies were evaluated to find optimal collector(s) from 19 possible candidates. Collector 2, 5, and 8 were the top performing collectors chosen from microflotation experiments. A design of experiment matrix was set up to evaluate the variables, variable interactions, and provide a reference matrix for future optimization studies. Collector 2 was assessed to be the optimal collector. A rougher flotation experiment produced a rare earth oxide grade and recovery of 41% and 78%, respectively with a 91.5% rejection of calcite. Collector 8 and 14 also showed promising results to replace fatty acid.

Introduction

Rare earth element (REE) production is important because they have broad and diverse applications in today's industry. China is the leading producer of rare earths with over 90% of the worldwide production. To avoid being dependent on China, the United States needs to find an economically viable process to produce rare earth elements. The rare earth elements include scandium, yttrium, and the light and heavy lanthanides. Rare earth elements are generally found together as rare earth oxides. Some common applications are: catalyst, phosphors, optics polishing media, magnets, batteries, and lasers. Finding suitable replacements for rare earths is difficult because of the strength, durability, and resistance to oxidation that they offer. The three largest reserves of rare earths are located in China, Brazil, and Russia according to a recent United States Geological Survey, and the world reserves total approximately 120 million metric tons of rare earth oxides [1].

The ability to separate each element from the mineral and the desired mineral from the gangue minerals are major challenges that have been drawing a lot of attention in the past few decades. Bastnaesite is one of the most abundant minerals that contain rare earth elements. Bastnaesite is a rare earth fluorocarbonate, and pure or concentrated samples contain up to 75% rare earth oxide, which contains approximately 50% cerium oxide. Bastnaesite minerals are found in vein deposits, contact metamorphic zones, and pegmatites [2]. Barite, calcite, silicate, and dolomite are the major gangue minerals associated with bastnaesite, which have similar properties and behavior as bastnaesite. This drives the need to understand surface chemistry using fundamental studies to find optimal conditions for selective adsorption of reagents and flotation of the desired mineral, bastnaesite.

Froth flotation is a method used to separate desired minerals from gangue minerals based on selective adsorption of reagents. The goal of flotation is to have the desired mineral in solution attach to an air or nitrogen bubble and form a froth layer, which is periodically scraped off and collected. Bastnaesite is a hydrophilic mineral so collectors are required to make the mineral hydrophobic. The hydrophobic minerals can then attach to the air bubbles and form a froth. It is important to find a collector that has selectivity for the desired mineral over gangue minerals to provide a good separation. Depressants can be used to coat certain mineral surfaces to inhibit adsorption of the collector on gangue minerals. No depressants are currently able to completely depress all gangue minerals; thus, collector selectivity is very important.

Collectors are organic electrolytes that can be either anionic or cationic, and they usually have a polar ionic function group that determines selectivity and a hydrocarbon tail that relates to collector solubility. Fatty acids, hydroxamic acids, and phosphoric acids have been used in the study of the beneficiation of bastnaesite. The major difference in these collector groups is the atom that the oxygen atoms are attached (carbon, nitrogen, and phosphorous) [3]. The collectors currently used do not provide selectivity of bastnaesite over its gangue minerals; therefore, there is an incentive to find an ideal collector.

Fatty acids are frequently used because they are inexpensive and there has been extensive research done with them, but they require a lot of energy and reagents to get some selectivity. Hydroxamates have been researched as a replacement to fatty acids because they provide an increased selectivity of bastnaesite due to chelation. The mechanism for chelation precedes with the dissolution of the metal cation, hydrolysis of the cation, hydroxyl complex formation, and finally the re-adsorption of the hydroxyl complex on the mineral surface [4][5]. Chelation of a particle's surface may occur when the lattice atom is oriented such that the steric hinderance between ligand molecules is minimized during the bond formation step [6].

Based on literature, collectors with aromatic hydroxamic acids and unsaturated groups are strong donors due to Intramolecular hydrogen bonding. These were important factors when designing new collectors [7]. Hydroxamates have gained selectivity due to the substitution of a nitrogen atom for a carbon atom that is bound to the oxygen atom of the collector's functional group. This bond decreases electronegativity and creates a weaker interaction with metal cations. Because rare earth metal cations are one of the more stable classes of hydroxamate-metal complexes, the selectivity of REE over the gangue is increased. The gangue minerals do not make as stable of complexes so they do not bind as favorably with hydroxamates [7][8].

Phosphoric acids have been increasingly studied as flotation collectors because they form complexes with transition metals and alkaline earths such as cassiterite, chromite, and bastnaesite. Since the bonding atom is phosphorous, these collectors are less electronegative than carboxylic acids and hydroxamates. This allows the oxygen atom to more readily form complexes with metal cations [3].

Since flotation Is a complex process, other reagents are introduced such as depressants, pH modifiers, and/or frothing agents. Soda ash is used in flotation to adjust the pH of the pulp and control the carbonate equilibria. Sodium carbonate contributes to the absorption and charge at the mineral water interface due to it being a potential determining ion. Lignin sulphonate has been shown effectively depress barite and partially calcite for both fatty acids and hydroxamate collectors [7].

Research on the beneficiation of bastnaesite often includes both microflotation and bench scale flotation to study collector effects on the recovery of rare earths and rejection of gangue minerals. Calcite is a major problem in bastnaesite flotation because of the downstream acid consumption it requires. Microflotation is an important fundamental study because of the ability to control process variables and the large number of tests that can be done in a short amount of time. Bench scale flotation is used to determine how the reagents affect flotation performance when the scale of flotation and slurry density is increased.

Methods and Materials

The ore samples used in this flotation research were obtained from Mountain Pass Mine in California. All ore samples were jaw crushed, roll crushed, and separated into representative samples using a Jones Riffle. The mineralogy was determined by x-ray fluorescence (XRF) and mineral liberation analysis (MLA). The latter was performed by Montana Tech to find mineral composition and the optimal liberation of bastnaesite. Grinding times ranging from 0 to 90 minutes were analyzed at multiple size fractions. A 60-minute grinding period and −200×400 mesh size fraction were chosen for the microflotation experiments due to the high liberation and composition of bastnaesite in the ore as shown in Table 5. The P80 of the 60-minute size fraction was 50 μm, which is similar to the particle size used in industry for REO flotation. Although there was high liberation in the 90-minute and −400 mesh size fractions, they were not chosen because of the negative effect particles in this size fraction can have on flotation.

TABLE 5

Mineral Composition of bastnaesite ore after a 60 minute grind period based on size fraction.

| Mineral | Formula | +100 | 100 X 200 | 200 X 400 | −400 | Modal |
|---|---|---|---|---|---|---|
| Barite | BaSO4 | 7.29 | 10.2 | 20.9 | 33.8 | 27.3 |
| Calcite | CaCO3 | 11.8 | 21.5 | 20.8 | 17.6 | 19.0 |
| Bastnaesite | (Ce, La)(CO3)F | 2.99 | 4.12 | 10.7 | 12.8 | 11.3 |
| Dolomite | CaMg(CO3)2 | 5.22 | 14.4 | 13.3 | 8.97 | 10.89 |
| Quartz | SiO2 | 4.28 | 12.6 | 9.84 | 5.14 | 7.38 |
| K_Feldspar | KAlSi3O8 | 4.19 | 11.4 | 735 | 4.02 | 5.81 |
| Strontianite | SrCO3 | 0.63 | 1.78 | 233 | 2.77 | 2.53 |
| Parisite | Ca(Ce, La)2(CO3)3F2 | 0.93 | 1.11 | 1.79 | 2.77 | 2.29 |
| FeO | Fe3O4 | 9.76 | 2.73 | 2.19 | 2.18 | 2.25 |
| Mica | KAl2(AlSi3O10)(OH)2 | 1.43 | 5.57 | 2.68 | 1.41 | 2.21 |
| Biotite | K(Mg, Fe)3(AlSi3O10)(F, OH)2 | 40.5 | 6.35 | 2.01 | 1.19 | 2.03 |
| Monazite | (La, Ce)PO4 | 0.25 | 0.48 | 0.99 | 2.07 | 1.57 |
| Celestine | SrSO4 | 0.33 | 0.71 | 1.11 | 1.77 | 1.45 |
| Ankerite | CaFe(CO3)2 | 4.12 | 2.05 | 1.02 | 1.32 | 1.30 |
| Plagioclase | (Na, Ca)(Al, Si)4O8 | 0.85 | 2.21 | 1.47 | 0.66 | 1.07 |
| Chlorite | (Mg3, Fe2)Al(AlSi3)O10(OH)8 | 1.27 | 1.57 | 0.59 | 0.38 | 0.57 |
| Apatite | Ca5(PO4)3F | 0.08 | 0.10 | 0.21 | 0.36 | 0.29 |
| Hornblende | (Ca2, Na)(Mg2FeAl)Si6O22(OH)2 | 1.01 | 0.48 | 0.28 | 0.14 | 0.22 |
| Allanite | (Ca, Ce)2(Al, Fe)3(SiO4)(Si2O7)O(OH) | 2.75 | 0.28 | 0.10 | 0.25 | 0.21 |

TABLE 5-continued

Mineral Composition of bastnaesite ore after a 60 minute grind period based on size fraction.

| Mineral | Formula | +100 | 100 X 200 | 200 X 400 | −400 | Modal |
|---|---|---|---|---|---|---|
| Rutile | $TiO_2$ | 0.04 | 0.12 | 0.10 | 0.14 | 0.12 |
| Galena | PbS | 0.03 | 0.01 | 0.04 | 0.16 | 0.11 |
| Magnetophumbite | $Pb(Fe, Mn)_{12}O_{12}$ | 0.01 | 0.04 | 0.04 | 0.06 | 0.05 |
| Kaolinite | $Al_2Si_2O_5(OH)_4$ | 0.04 | 0.11 | 0.07 | 0.02 | 0.04 |
| Ilmenite | $FeTiO_3$ | 0.10 | 0.11 | 0.03 | 0.02 | 0.03 |
| Pyrite | $FeS_2$ | 0.02 | 0.02 | 0.03 | 0.01 | 0.02 |
| Pyroxene | $CaMgSi_2O_6$ | 0.05 | 0.06 | 0.02 | P | 0.01 |
| Zircon | $ZrSiO_4$ | P | 0.01 | P | 0.02 | 0.01 |
| Thorite | $ThSiO_4$ | ND | ND | 0.01 | 0.01 | 0.01 |
| Enargite Tenn | $Cu_3AsS_4$ | ND | P | P | P | P |
| Plumbophyllite | $Pb_2Si_4O_{10}H_2O$ | 0.01 | P | P | P | P |

The material used for bench flotation was ground using a higher-powered roll crusher to obtain larger quantities of material. The product was ground for 45 minutes then wet sieved to 100% passing 100 mesh. The slurry was then filtered and dried. A particle size analysis was done on this product. The ground ore was wet-sieved through a 325-mesh screen. Both size fractions were then collected and dried. The +325-mesh sample was then run through a dry rotap for 25 minutes using 100, 115, 150, 200, 270, and 325 mesh screens. The material and each fraction was dried and weighed. The P80 of the ground material was approximately 50 μm.

X-ray fluorescence was used to measure the elemental compositions of the ore, flotation concentrates, and flotation tails. A method was set up using the XRF software to obtain a multivariable regression fit line based on standards with known compositions. The compositions of the elements in the ore were then fit to each of the corresponding regressions and converted from elemental composition to oxide composition. The REO compositions were determined from the cerium content since it provided the most consistent rare earth contents compared to Molycorp data. The cerium oxide content makes up 49.1% of the rare earth oxide content in the Mountain Pass ore deposit. The ore samples were fused into discs using a Katanax K1 Prime Fluxer. The discs were made using 2% sample and 98% lithium borate flux. The fusion discs allowed for a consistent and uniform sample without mineralogical effects to be analyzed by the XRF. The XRF results for the materials used in the fundamental studies and bench flotation are shown in Table 6. These results are consistent with Molycorp data, which had a head grade of approximately 8% REO.

TABLE 6

XRF oxide composition for microflotation (−200 × 400 mesh) and bench flotation (−100 mesh)

| Mineral | Fundamental Studies Material Composition (%) | Bench Flotation Composition (%) |
|---|---|---|
| REO | 7.70 | 8.01 |
| CaO | 16.29 | 16.91 |
| BaO | 12.61 | 13.72 |
| $SiO_2$ | 14.81 | 12.97 |

There were 19 collectors used in this research that were obtained from Oak Ridge National Laboratory. The collectors were labeled 1 through 18 and the tall oil was labeled as fatty acid. Not all collectors were water soluble. These collectors were dissolved in ethanol then emulsified in the ore slurry. Table 7 lists the reagents used in this research.

TABLE 7

Reagent Type, Name, and Chemical Formula

| Type | Name | Chemical Formula |
|---|---|---|
| Depressant | Ammonium Ligno Sulfonate | $C_{20}H_{17}O_{10}S_2$ (Lignin Sulphonate) |
| Frother | Methyl Iso-Butyl Carbonyl | $C_6H_{14}O$ |
| Depressant | Sodium Carbonate | $Na_2CO_3$ |
| pH modifier | Hydrochloric Acid | HCl |
| pH modifier | Potassium Hydroxide | KOH |
| Ore | Bastnaesite | $(Ce, La)(CO_3)F$ |
| Flux | Lithium Borates | 66.67% $LI_2B_4O_7$, 32.83% $LiBO_2$, 0.5% LiBr |
| Collector | Tall Oil | $C_{18}H_{33}NaO_2$ (Sodium Oleate) |
| Solvent | Ethanol | $C_2H_6O$ |

Bastnaesite ore was used for all the microflotation experiments. A Partridge Smith Cell was used for the microflotation experiments. A 52-mL solution was made up with 1% ore, collector, pH modifier, and frother. The experiments were conducted of variable pH (8-11) and collector concentration. The ore was added to distilled water then placed on a stir plate. The pH was adjusted and maintained through the 15-minute conditioning stage. The dissolved collector was added to the slurry once the pH was set. Non-water-soluble collectors were dissolved in ethanol then emulsified by ultrasonication for three minutes before conditioning. One drop of frother was added to each experiment with 2 minutes remaining in the conditioning period. After the conditioning stage, 10 mL of the supernatant was extracted. The slurry was added to the microflotation cell then the beaker was rinsed with the extracted supernatant into the cell to prevent loss of material. A stir bar was added to agitate the solution. Compressed air was then introduced to the cell at a flow rate of 26.6 cm3/min. No heat, depressant, or pure minerals were used for the microflotation experiments to ensure selectivity was from the collector. The concentrates and tails were both filtered and dried. The experiments were done in duplicate then the respective concentrates and tails were combined to get enough sample to be fused into discs. The discs were then analyzed on the XRF.

A Metso Denver D-12 Legacy cell was used to conduct each experiment. A cell was used with 1 L of distilled water and 25 wt % solids. A screening test was conducted using the Stat-Ease software to test the variables listed in Table 8.

TABLE 8

| Bench Flotation Variables | |
|---|---|
| Variable | Range |
| Collector | Collector 2, 5, 6, 8, 14, fatty acid |
| pH | 8.5, 9.5, 10.5 |
| Temperature (Celsius) | Ambient, 50, 81 |
| Collector Concentration (g collector/kg ore) | High-Low (based on microflotation results) |
| pH adjustor | Soda Ash, KOH, HCl |
| Depressant Concentration (M) | 0, 0.75, 1.5 |
| Continued pH adjustment | No, Yes |

For each experiment, the temperature of the slurry was adjusted before conditioning. Once the pH was adjusted, the depressant was added followed by a five-minute conditioning period. This five-minute period was bypassed for tests not requiring depressant. The collector was then added to solution for 10 minutes. Non-water-soluble collectors were dissolved in ethanol then emulsified by a Hamilton Beach Commercial HMI200 Immersion Blender for three minutes. The conditioning was done at 900 rpm rotor speed. 1 drop of frother was added to each experiment except with fatty acid as it hindered froth formation. A 4-minute flotation step was performed after the conditioning stage. The concentrates and tails were pressure filtered, dried, fused into discs, and analyzed with the XRF.

Results and Discussion

Figure 20:
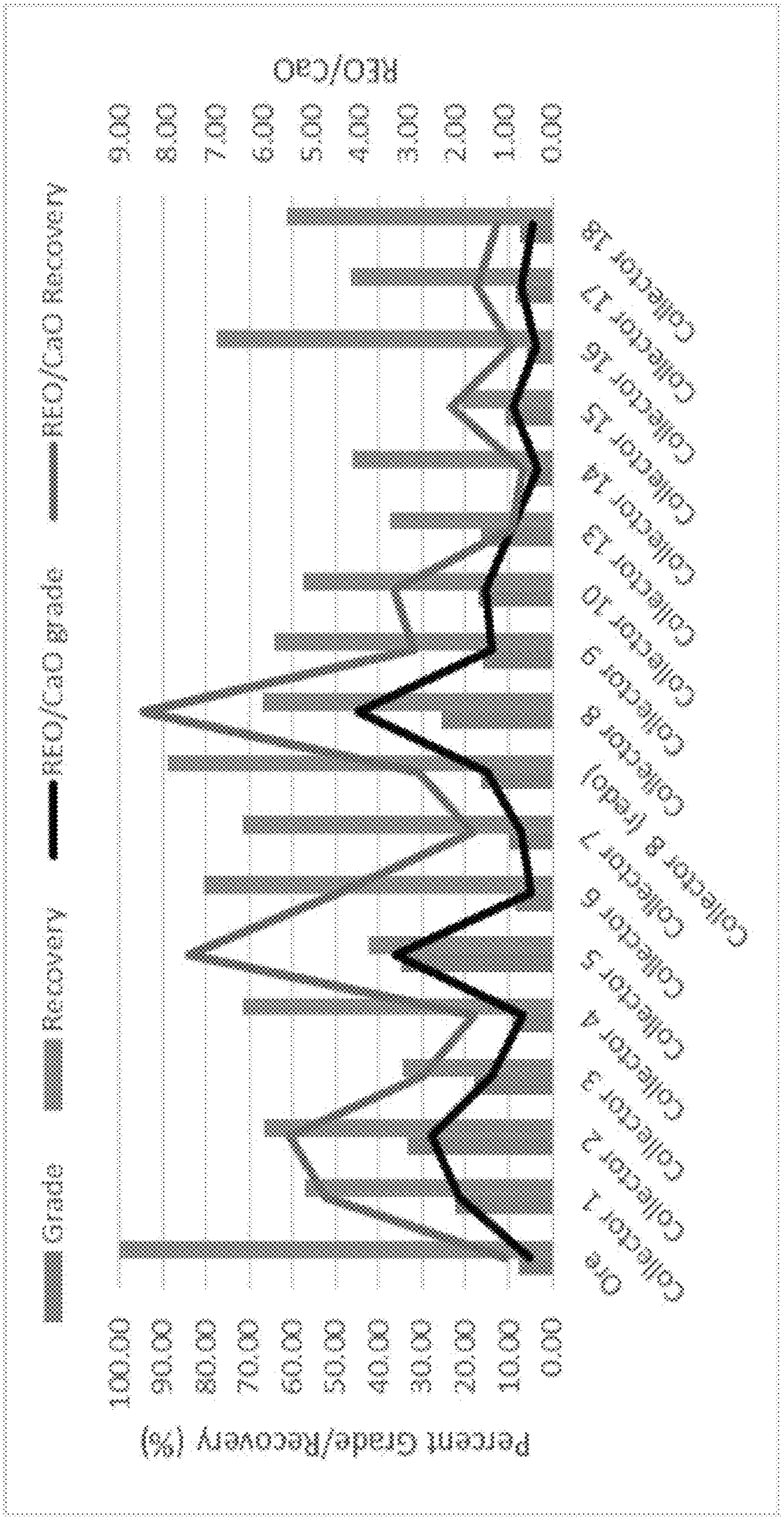
FIG. 20: The primary axis compares the grade (blue) and recovery (orange) percentages versus the collector type. The secondary axis compares the ratio of REO to CaO grade (black) and recovery (green) to the collector type.

Microflotation was used to screen the 19 collector candidates to find three candidates that had the highest selectivity and recovery of bastnaesite over the gangue minerals: calcite, barite, and silicate. FIG. 20 shows the results for the optimal condition of each collector. Multiple tests were initially run for each collector to find a concentration range that would float approximately a third of the ore, half of the ore, and two-thirds of the ore. Although this graph only shows the best condition, each collector was run at nine different conditions with pH and/or collector concentration being adjusted.

Collector 11 and 12 were not included in this figure because no condition tested was able to produce enough flotation concentrate to be analyzed. Fatty acid microflotation was also unsuccessful in producing a froth unless an unreasonable high concentration was used compared to the charge required for bench flotation. This may be attributed to the low slurry density used for microflotation. The frother used for every other collector could not be used for fatty acid because it destabilized the froth.

In FIG. 20, collector 8 had the best rejection of calcite and a higher REO grade and recovery. This collector was run twice because only two of the nine conditions tested showed selectivity. The result showed the same trend but was not fully repeatable. Collector 8 was still chosen to move on to bench flotation based on the promising results.

The microflotation results show collector 1, 2, 5, and 8 to have the highest increase in grade in the concentrate from the head grade of the ore. Collector 2 and 5 produced a rare earth oxide grade of approximately 33% and 35%, respectively. Although the respective REO recoveries were not very high, some other conditions tested by each collector were able to achieve high recoveries and only suffered slightly lower grades. The collectors that did not produce a significant increase in grade compared to the head grade were excluded from the potential top performing candidates.

Figure 21:
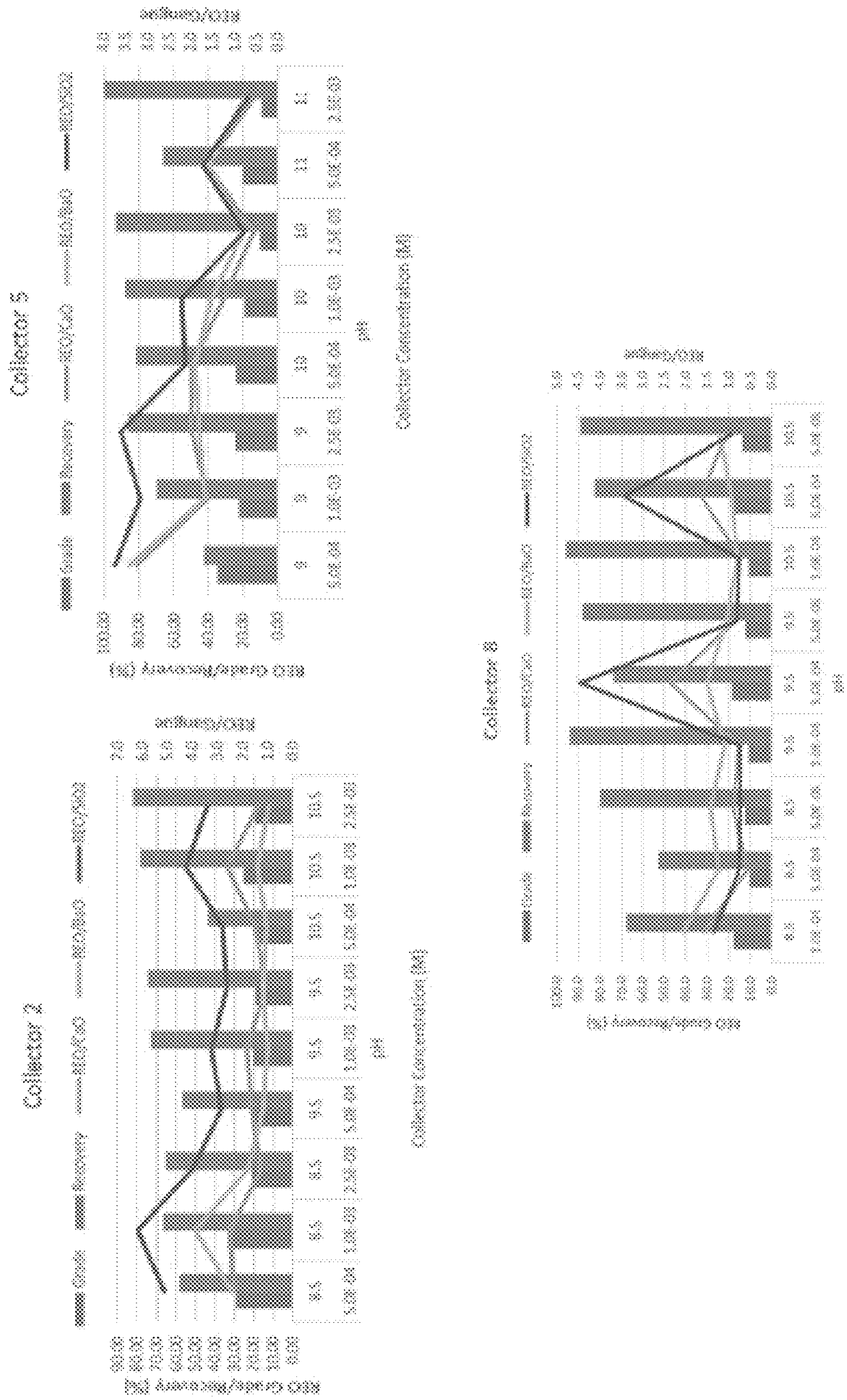
FIG. 21: Grade/recovery and gangue rejection ratios versus the corresponding pH and collector concentration for collector 2 (top left), collector 5 (top right) and the average of the collector 8 runs (bottom).

Collectors 2, 5, and 8 had the highest rejection of calcite, which was a major factor because of the downstream costs. They also provided very good rejection of barite and silicate. From the REO grade, REO recovery, and gangue rejection, collectors 2, 5 and 8 were chosen for bench flotation experiments. Collector 6 and fatty acid were also selected for further testing as a comparison to previous research. Collector 14 was chosen due to its similarity of structure to oleic acid. FIG. 21 shows the REO grade and recovery for each experimental condition for collectors 2, 5 and 8. The secondary axis depicts the ratios of REO to the gangue. From this graph, the trends are shown for each collector. Collector 2 and 5 show the best selectivity at lower pH values; collector 8 shows the flotation is very dependent on collector concentration and pH.

Figure 22:
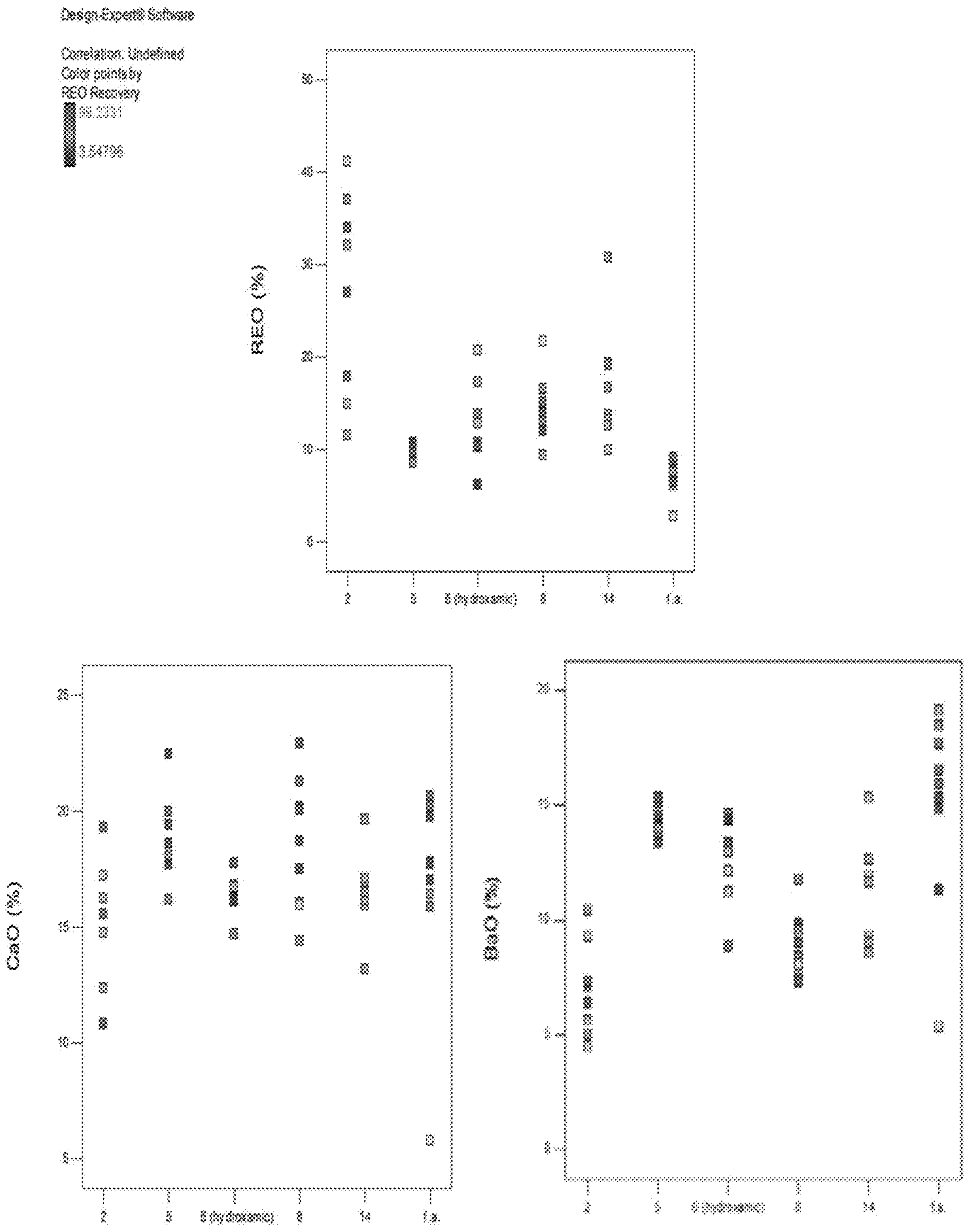
FIG. 22: Grade (REO—top left, CaO—top right, BaO—bottom) percentage and REO recovery percentage versus collector type. The color represents the REO recovery percentage corresponding to the color shown in the top left corner of each graph.

Rougher bench flotation was done using the six collectors described above. Two groups of flotation experiments were performed: a screening test and initial tests to get a frame of reference for the flotation variables. The variables included in the experiment were collector type, collector concentration (low, high), depressant concentration (0-1.5 mM), heat addition (RT-82° C.), pH (8.5-10.5). pH modifier (KOH, soda ash), and whether the pH modifier was added continuously throughout the experiment or just initially. The screening matrix was set up using the Design Experiment 10 developed by Stat-Ease to determine the significant factors and interactions for each response. The four responses chosen were REO grade (%), CaO grade (%), BaO grade (%), and REO recovery (%). The design of experiment matrix included: factorial screening design, categoric factors, 50 randomized runs, 40 model points, and 10 residuals (5 lack of fit, 5 replicate). The number of runs was chosen to get a power value over 80% for each variable. Once all the experimental data was entered into the Stat-Ease software, grade and recovery outputs were examined to get a visual look at each response as shown below in FIG. 22.

The grades of REO, CaO, and BaO in the head grade ore are approximately 8%, 17%, and 14%, respectively. The graphs show that collector 2 produced the most promising and consistent results for each of the responses.

Figure 23:
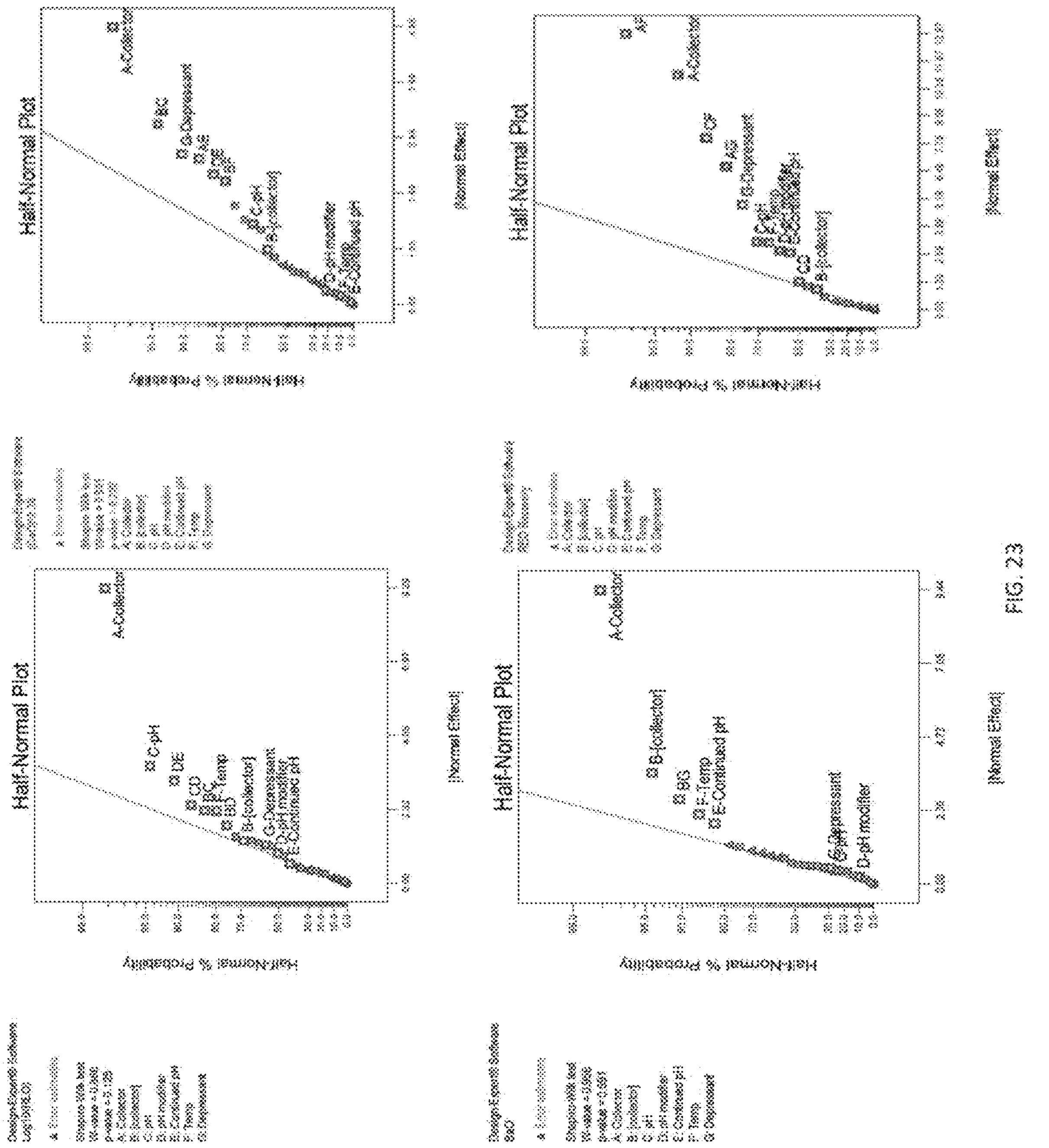
FIG. 23: Half-Normal plots for REO grade (top left), CaO grade (top right), BaO grade (bottom left), and REO recovery (bottom right) in the concentrate.

To determine the significant factors and interactions for the variables, Half-Normal plots were developed for each response. Using the ANOVA statistical analysis and Box-Cox plots for power transformations, the factors and interactions included in the half-normal plot were chosen to optimize the models shown in FIG. 23.

The models were determined to be significant based on the model F-value, which describes if the error could be due to noise. The p-value was analyzed for each model and factor/interaction included in the model. The Half-Normal plot allows separation of effects into large and small effects. The large effects are (usually to the right of the graph and red line) are likely to be repeatable effects; the small effects (lower left corner of graph) are likely to be caused by noise. The significant model factors and interactions are shown in Table 9 for each response.

TABLE 9

| Significant Model Factors | |
|---|---|
| Response | Significant Model Terms |
| REO Grade (%) | Collector type, pH, Temperature, Collector conc.-pH, pH-pH modifier, pH modifier-Cont. pH |

TABLE 9-continued

| Significant Model Factors | |
|---|---|
| Response | Significant Model Terms |
| BaO Grade (%) | Collector type, Collector conc., Temperature, Collector conc.-Depressant conc. |
| CaO Grade (%) | Collector type, Depressant conc., Collector type-Cont. pH, Collector conc.-pH, Collector conc.-Temperature, pH modifier-Cont. pH |
| REO Recovery (%) | Collector type, pH, pH modifier, Temperature, Depressant conc., Collector type-Temperature, Collector type-Depressant conc., pH- Temperature |

Once the model was determined significant, the model graphs were used to look at the different factors and interactions for each of the responses. It might be difficult to compare which overall collector concentration was best between collectors since each collector requires a different optimum concentration. From the model graphs, there was a large variability between which reagent scheme worked best for each of the responses. This proves how complex froth flotation is and how hard it can be to find optimal flotation conditions. The design of experiment software also generated an optimization study from the chosen variable parameters. It predicted a further increase in grade, recovery, and gangue rejection, which is feasible due to the limited number of runs completed for each collector.

Figure 24:
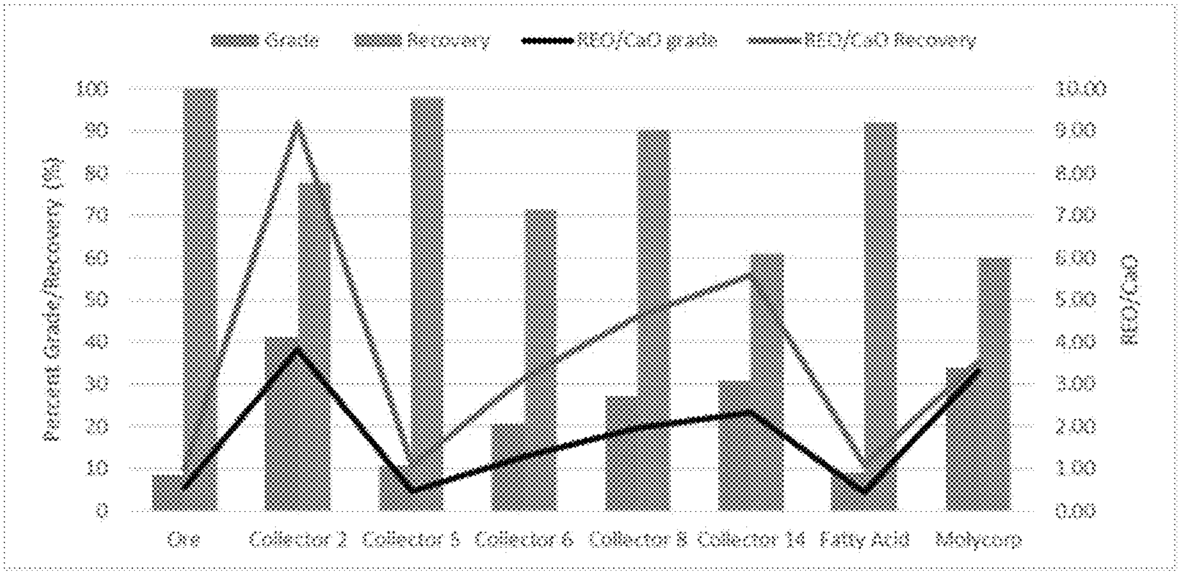
FIG. 24: Grade/recovery and REO upgrade ratio to calcite versus collector type for the optimal flotation conditions for each collector

FIG. 24 shows the optimal rougher bench flotation condition for each of the collectors. Data from the initial test work is included along with the data from the DOE matrix. The figure also shows the estimated flotation conditions from flotation experiments done by Molycorp. From this graph, collector 2 shows a significant increase in REO grade, REO recovery, and calcite rejection compared to the rest of the collectors tested and results from industry. Collectors 8 and 14 also exhibit promise as possible replacements to fatty acid flotation because of the increased rare earth recovery, calcite rejection, and they did not require heat addition.

Collector 5 was tested at variable concentrations, but no selectivity of bastnaesite or increase in REO grade/recovery was exhibited compared to the promising results from microflotation experiments. Fatty acid did not produce expected results. This may result from the limited and randomized flotation conditions since fatty acid has shown in previous literature to only gain selectivity at high temperature and depressant additions. Other possible explanations could be due to a different composition of tall oil (low rosin content) or lower slurry density.

MLA analysis was done on the flotation concentrates of collectors 2, 5, and 8. The sample was chosen based on the conditions that provided the best flotation performance. The mineralogy is shown in Table 10 for each of the collectors. The MLA analysis found the liberation of bastnaesite was 72% for collector 2 and 14 and 66% for collector 8. Bastnaesite accounted for approximately 80% of the cerium content with parasite and monazite accounting for the rest. Based on these MLA results, the unliberated particles may attribute to the gangue minerals in the flotation concentrate. Increasing the liberation of the ore without grinding to a size that would inhibit flotation could increase the rejection of gangue minerals and collector selectivity. Full rejection of calcium may not be possible as parasite and dolomite are significant sources in the flotation concentrates. There is still room for collector selectivity and process improvement as there is at least 11% calcite in the concentrates, which needs to be removed.

TABLE 10

| MLA Modal Mineral Content for the flotation concentrates of the selected collectors. | | | | |
|---|---|---|---|---|
| Mineral | Formula | C2 | C8.7 | C14 |
| Bastnaesite | (Ce0.6La0.3Nd0.1)(CO3)F | 8.5 | 34.2 | 40.7 |
| Calcite | CaCO3 | 1.0 | 12.4 | 14.2 |
| Parisite | Ca(Ce0.6, La0.3Nd0.1)2(CO3)3F2 | 0.7 | 9.68 | 7.28 |
| Barite | BaSO4 | .62 | 9.38 | 11.4 |
| Dolomite | CaMg(CO3)2 | .80 | 3.75 | 7.19 |
| Monazite | (La, Ce)PO4 | .15 | 4.43 | 3.69 |
| Strontianite | SrCO3 | .58 | 4.49 | 2.96 |
| FeO | Fe2O3 | .15 | 3.48 | 1.98 |
| Quartz | SiO2 | .80 | 3.18 | 2.47 |
| Ankerite | CaFe(CO3)2 | .42 | 4.04 | 1.38 |
| K_Feldspar | KAlSi3O8 | .04 | 2.55 | 1.61 |
| Allanite | (Ca, Ce0.7, La0.2, Nd0.1)2(Al, Fe)3 (SiO4)(Si2O7)O(OH) | .77 | 1.74 | 0.34 |
| Celestine_Ba | Sr0.65Ba0.35SO4 | .71 | 0.86 | 1.22 |
| Hornblende | (Ca2, Na)(Mg2FeAl)Si6O22(OH)2 | .46 | 1.33 | 0.66 |
| Ancylite | Sr(Ce, La)(CO3)2(OH), H2O | .62 | 1.01 | 0.26 |
| Apatite | Ca5(PO4)3F | .71 | 0.24 | 0.38 |
| Chlorite | (Mg3, Fe2)Al(AlSi3)O10(OH)8 | .26 | 0.49 | 0.32 |
| Pyx_Amph | (CaMgSi2O6)(Ca2, Na)(Mg2FeAl)Si6O22(OH)2 | .24 | 0.31 | 0.26 |
| Muscovite | KA12(AlSi3O10)OH2 | .21 | 0.28 | 0.30 |
| Rutile | TiO2 | .29 | 0.31 | 0.19 |
| Anglesite | PbSO4 | .19 | 0.30 | 0.20 |
| Ferroan_ Magnesite | (MgFe)CO3 | .12 | 0.27 | 0.16 |
| Galena | PbS | .08 | 0.14 | 0.22 |
| Coronadite | PbMn8O16 | .09 | 0.20 | 0.06 |
| Plagioclase | (Na, Ca)(Al, Si)4O8 | .04 | 0.18 | 0.07 |
| Pyrite | FeS2 | .07 | 0.12 | 0.06 |
| Ilmenite | FeTiO3 | .08 | 0.07 | 0.08 |
| Hollandite | BaMn8O16 | .03 | 0.10 | 0.04 |
| Aegirite | NaFeSi2O6 | .05 | 0.07 | 0.05 |
| Andradite | Ca3Fe2(SiO4)3 | .03 | 0.11 | 0.04 |
| Epidote | Ca2(Al, Fe)3SiO3O12OH | .02 | 0.07 | 0.06 |
| Svanbergite | SrAl3(PO4)(SO4)(OH)6 | .04 | 0.04 | 0.03 |
| Zircon | ZrSiO4 | .01 | 0.05 | 0.03 |
| Thorite | ThSiO4 | .04 | 0.02 | 0.02 |
| Titanite | CaTiSi05 | .01 | 0.04 | 0.01 |
| Pyrochlore | (Ca, Na)2Nb2O6(OH, F) | .02 | 0.03 | 0.01 |
| Sphalerite | ZnS | .02 | 0.02 | 0.02 |
| Chervetite | Pb2V2O7 | .01 | 0.01 | 0.02 |
| Xenotime | YPO4 | P | 0.01 | P |

P—mineral present, but found at less than 0.01%
ND—mineral not detected

SUMMARY AND CONCLUSIONS

The beneficiation of rare earth oxides was studied to find a collector that increased the grade and recovery of rare earths while rejecting gangue minerals. An optimal particle size, mineral composition, and liberation were accomplished through mineralogical studies. The P80 of the bastnaesite ore was calculated to be 50 μm for all the flotation studies. Microflotation was used to narrow the 19 candidate collectors to the three top performing collectors: collector 2, collector 5, and collector 8. Design of experiment was used to determine the significant variables and interactions. Collector 2 was evaluated to be the best collector; collector 8 and 14 both showed promise as potential replacements for fatty acid, also. There is potential to optimize each flotation scheme for all the novel collectors based on limited flotation experiments done per collector. Only rougher flotation was studied so the effect of how the collector would perform in cleaner or scavenger flotation circuits is unknown.

Bastnaesite Separations by Froth Flotation and Gravity Separation by: Nathanael Williams, Dr. Corby Anderson Rare earth elements are in high demand in the United States. Independence from the importation of rare earths is essential to alleviate dependence on China for these rare earth elements. Bastnaesite, a rare earth fluorocarbonate containing primarily cerium and lanthanum, is one of the most abundant sources of rare earths in the United States. This research was completed using the ore from Mountain Pass, which is the largest rare earth mine in the United States.

This research was done to find a way to combine flotation with novel collectors and gravity separation techniques to reach an enhanced grade and recovery of rare earth elements while rejecting the gangue minerals, calcite, barite and silicate minerals. Four collectors were examined. They were N,2-dihydroxybenzamide, N-hydroxycyclohexanecarboxamide, N,3-dihydroxy-2-naphthamide, and N-hydroxyoleamide. Through this analysis it was determined that, to obtain the desired results, that flotation would be the rougher stage and the gravity separation would be utilized as the cleaner stage. Bench scale flotation tests were conducted on the run of mine ore using conditions that were determined using a previously calculated Stat Ease model. The bench tests that produced the most desirable results were then scaled up to a 10 kilogram float test. A concentrate from this test showed a rare earth oxide grade of 44%, while rejecting 91% of the calcite. This concentrate was used for gravity separation. Through gravity separation it was found that another 40% of the calcite could be rejected with a final rare earth oxide grade of 47% in the concentrate.

Introduction

Rare earth elements (REEs) are an essential part of technological growth and development. Finding a cheap source of them is necessary for this growth to continue. China is currently the world's leading producer of REEs. [1] In 2016 the United States did not produce any REEs, leading to dependence on foreign sources for rare earths. [2] This study focuses on the beneficiation of bastnaesite, a rare earth fluorocarbonate, from an ore provided by the Mountain Pass mine located in Southern California. Bastnaesite is primarily composed of cerium and lanthanum oxides. Some of the uses of cerium and lanthanum are in the production of catalytic converters, steel, and camera lenses. [3]

The primary goal of mining this ore is to separate out the rare earth bearing minerals from the gangue minerals. The gangue minerals of this ore body include calcite, dolomite, barite and silicate minerals. This study focused on froth flotation and gravity separation as primary methods of separations. For flotation to be optimized, the surface chemistry of the materials that will be floated needs to be understood. The optimization of gravity separation depends on grain size and the amounts of the gangue minerals that remain in the ore body.

Froth flotation is a separation method that changes the surface chemistry of desired minerals, rendering them hydrophobic which allows the desired minerals to attach to air bubbles and float to the surface of the water, forming a froth. Collectors are the primary chemical added into the system to aid in flotation. They are broken up into two groups, anionic and cationic, the former is the most commonly used collector type for bastnaesite flotation. Fatty acids and hydroxamates are the primary collectors that have been used or researched for the Mountain Pass mine material. [4]

Hydroxamates are collectors that have proven to be more selective to bastnaesite than the gangue minerals. This could be due to chelation, which is a type of bonding that allows two or more bonds to form between a ligand and a separate metal ion. [5] Four new collectors have proven to be selective to bastnaesite in a study completed by Dylan Everly. [6] These collectors were studied using microflotation and bench scale flotation.

Although collectors are the primary reagents used in flotation, there are others which are used to enhance the selectivity. Some other reagents include depressants, pH modifiers and frothers. Depressants are used as an aid to flotation by coating a mineral surface, inhibiting the adsorption of the collector onto that mineral surface. Ligin sulphonate is used in the flotation of bastnaesite to depress barite. Common pH modifiers are potassium hydroxide and soda ash. Soda ash has a dual purpose, as a pH modifier and a depressant, because it is a potential determining ion, which makes the flotation of bastnaesite more effective at a specific pH. [4]

Gravity separation is a technique involving the manipulation of particle densities to separate the less dense particles from the more dense ones. This study used the ultrafine Falcon centrifugal concentrator as gravity concentrator. This allows the separation to occur even with reduced particle sizes. [7] It was determined that, using gravity separation, the REE bearing minerals should be separable from calcite and dolomite.

Methods and Materials

All sample minerals were obtained from the Mountain Pass mine. The samples were cone and quartered to maintain homogeneity. They were then roll crushed. After roll crushing they were broken up into 10 kg samples using a Jones Splitter and placed into a rod mill with a capacity of 10 kg and ground to a P80 of 50 microns. The mineralogy of the sample was determined using x-ray fluorescence (XRF) and a mineral liberation analysis (MLA). Samples were sent to Montana Tech for MLA to be completed. MLA was completed on a run of mine ore sample and a gravity concentrated sample. The mineral concentrations of each sample can be seen in Table 11.

TABLE 11

The modal mineral concentrations in weight percent of the ore and the gravity concentrate.

| Mineral | Ore Sample | Gravity Concentrate |
|---|---|---|
| Barite | 20.9 | 32.9 |
| Bastnaesite | 12.9 | 15.9 |
| Calcite | 21.3 | 14.8 |
| Dolomite | 16.2 | 12.5 |
| Celestine | 8.59 | 7.35 |
| Quartz | 5.97 | 4.26 |
| K-Feldspar | 4.06 | 3.45 |
| Strontianite | 1.57 | 1.68 |
| Monazite | 0.84 | 1.63 |
| Iron Oxide | 0.60 | 1.03 |
| Biotite | 1.14 | 0.79 |
| Parasite | 1.81 | 0.96 |
| Synchysite | 0.67 | 0.75 |
| Chlorite | 1.53 | 0.63 |
| Allanite | 0.01 | 0.15 |

For the XRF analysis a method was used so that the results would be quantitative. The rare earth oxide (REO) compositions were calculated from that of cerium oxide because it is the most consistent throughout the deposit according to data provided from the mine. Cerium oxide makes up 49.1% of the REO content in the deposit. This agreed with the determined XRF data obtained throughout testing. The XRF analysis was used for all the concentrates and tailings from all of the test work. The samples were analyzed in the form of fused disks. The disks were made using the Katanax X-300 fluxer. The composition of the disks were 2% sample and 98% lithium borate flux. Table 12 shows the grades of the samples obtained from the XRF. The ore head grade is consistent with Molycorp data, which Indicated that there was a head grade of 7-8% REO.

TABLE 12

The XRF oxide compositions of the samples.

| Mineral | Ore Sample | Gravity Concentrate |
|---|---|---|
| REO | 6.74 | 11.97 |
| CaO | 17.08 | 13.07 |
| BaO | 13.24 | 19.49 |
| SiO2 | 13.7 | 6.66 |

Four collectors were used in this study, they were provided by Oak Ridge National Laboratory. They are referred to by their number in the remainder of this paper. Collectors 8 and 14 were insoluble in water, so they were dissolved in ethanol and emulsified into the slurry prior to flotation. The summary of the reagents used can be found in Table 13.

TABLE 13

Flotation reagents used in this study.

| Type | Name | Chemical Formula/Structure |
|---|---|---|
| Collector 2 | N,2-dihydroxybenzamide | 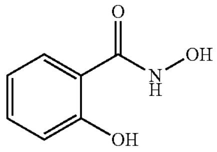 [SMILES: O=C(NO)c1ccccc1O] |
| Collector 5 | N-hydroxycyclohexanecarboxamide | 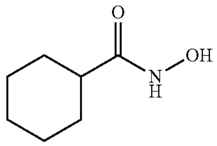 |
| Collector 8 | N,3-dihydroxy-2-naphthamide | 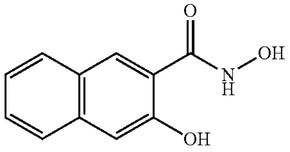 |
| Collector 14 | N-Hydroxyoleamide | 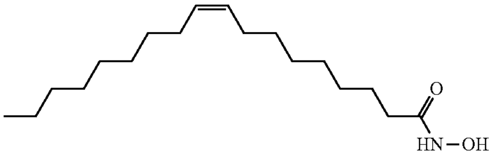 |
| Depressant | Ammonium Lignin Sulfonate | C20H17O10S2 |
| Frother | Methyl Iso-Butyl Carbonyl | C2H14O |
| Depressant/pH Modifier | Sodium Carbonate | Na2CO3 |
| pH Modifier | Hydrochloric Acid | HCl |
| pH Modifier | Potassium Hydroxide | KOH |
| Solvent | Ethanol | C2H5OH |

A microflotation study was completed on both samples using a Partridge-Smith Cell. The solution was made up of 0.52 grams solids and 52 mL water. For each experiment the sample was added to the solution along with a specific collector concentration. The pH was changed after the addition of the collector using potassium hydroxide. The slurry was conditioned for 15 minutes in a 100 mL beaker. After 13 minutes, a drop of frother was added to the slurry. After conditioning was completed, the slurry was placed into the Partridge-Smith Cell for flotation. Compressed air was added into the system at a flow rate of 26.6 cm3/min. The concentration of the collector was not varied for any tests involving that collector. The only variable was pH in the range of 9.5-10.5. No additional reagents were used. The experiments were executed in duplicates to obtain enough material to be analyzed by the XRF.

Bench flotation tests were conducted using a Metso Denver D-12 Legacy cell, 333 grams of material were added into a 1 liter slurry for flotation, forming a slurry concentration of 25 weight percent solids. If heat was required, then the water was heated before it was combined with the ore sample. For the bench flotation study additional reagents were used. If depressant was needed for the test, the ore, water and depressant were combined and allowed to condition for 5 minutes. If soda ash was being used as a pH modifier then once it was added to the slurry it was allowed to condition for 3 minutes. Once the pH was adjusted, then the collector was added and allowed to condition for 10 minutes. The collectors that needed to be dissolved in ethanol were added to the slurry, then emulsified for 3 minutes by a Hamilton Beach Commercial HMI200 Immersion Blender. If the pH needed to be modified further, it was done so during the final conditioning stage. Conditioning was done at 900 rpm. Two minutes before flotation began one drop of MBIC frother was added. After conditioning, air was allowed into the system and the sample was allowed to float for two minutes.

The 10 kilogram flotation tests were conducted using a flotation cell at Resource Development Inc. The sample used for the tests was removed from the rod mill and placed directly into the flotation cell. The slurry concentration was approximately 25 weight percent solids. If the test required heat, then the slurry was heated using a heating coil, placed directly into the slurry. Once the desired temperature was reached, the depressant was added, if needed. The slurry was then allowed to condition for 5 minutes. If soda ash was used as the pH modifier, then after it was added, the slurry was allowed to condition for 3 minutes. After the pH was changed, the collector was added into the solution. If pH needed to be changed after the collector was added, it was done immediately. The slurry was allowed to condition for 10 minutes. After 8 minutes, a single drop of MIBC frother was added. After conditioning was completed, air was allowed to enter the system and it was allowed to float for 2-8 minutes.

For the ultrafine falcon tests a Sepro Falcon semi-batch concentrator laboratory model L40, with an ultrafine bowl was used. Water was added to the feed tank in accordance with the required slurry density for the test, 15 weight percent solids. An agitator was used to prevent the solids from settling in the feed tank. Once the solids were added to the water, the Falcon concentrator was turned on to an rpm of 1313. The slurry was then allowed to enter the falcon at a flow rate of 5 L/min. The concentrate remained in the bowl and was removed and dried for analysis. The tailings were filtered and dried, then were used for another pass in the falcon concentrator. Three passes were run with the material and the products were analyzed with the XRF and MLA.

Results and Discussion

Figure 25:
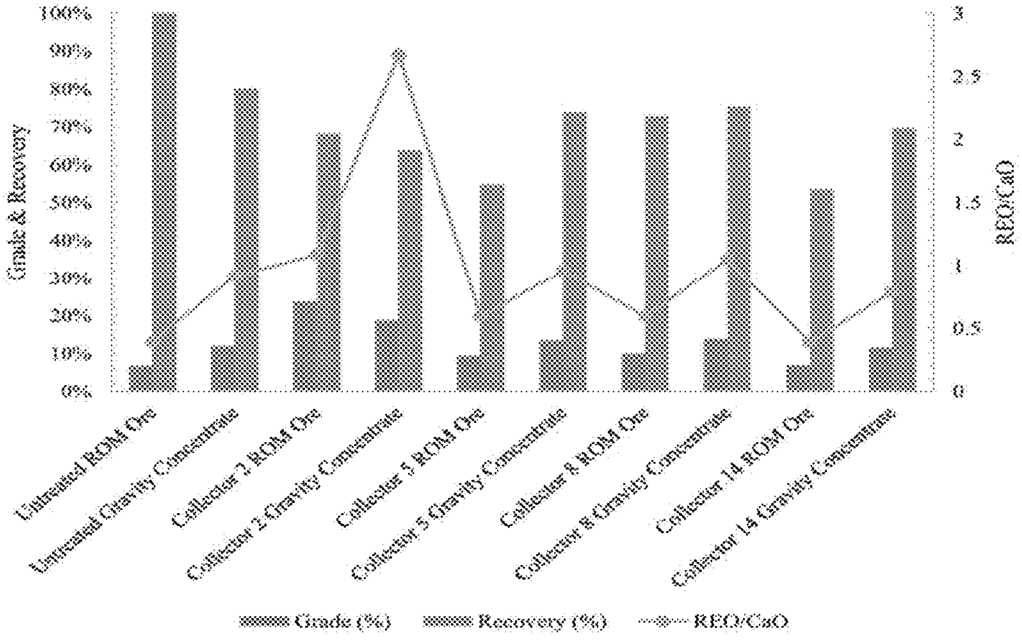
FIG. 25: The best microflotation results from each collector and the run of mine (ROM) ore and gravity concentrate flotation test work. Illustrating grade and overall recovery of REO along with the selectivity in the form of the REO/CaO ratio.

Microflotation was used for the screening of the run of mine ore (ROM) vs. the gravity concentrate. The surface chemistries of both were ascertained prior to testing and it was determined that the only variables would be pH and collector. The collector concentrations were determined from previous work completed by Dylan Everly. [6] Three tests were run for each collector and feed combination at 9.5, 10 and 9.5 pH. FIG. 25 shows the best results from each collector and feed combination.

The results indicate that the flotation of the gravity concentrate results in a higher REO/CaO ratio, although for most of the tests the REO/CaO ratio is not increased above that of the feed. The tests completed with collector 2 are the only exception. With either feed, flotation using collector 2 increased the REO/CaO ratio significantly. In the case of the flotation of the gravity concentrate the ratio increased from 0.9 to 2.7.

The REO grade is increased with the aid of these collectors in flotation, but the most significant increase can be seen with collector 2. Although both the ROM ore and the gravity concentrated treated with collector 2 had an increase in grade, collector 2 acted more favorably to the ROM ore sample rather than on the gravity concentrate. The REO grade of the ROM ore treated with collector 2 was 24% while for the gravity concentrate it was 19%. From these results it was determined that further test work would focus on gravity concentration as a cleaner to flotation.

Figure 26:
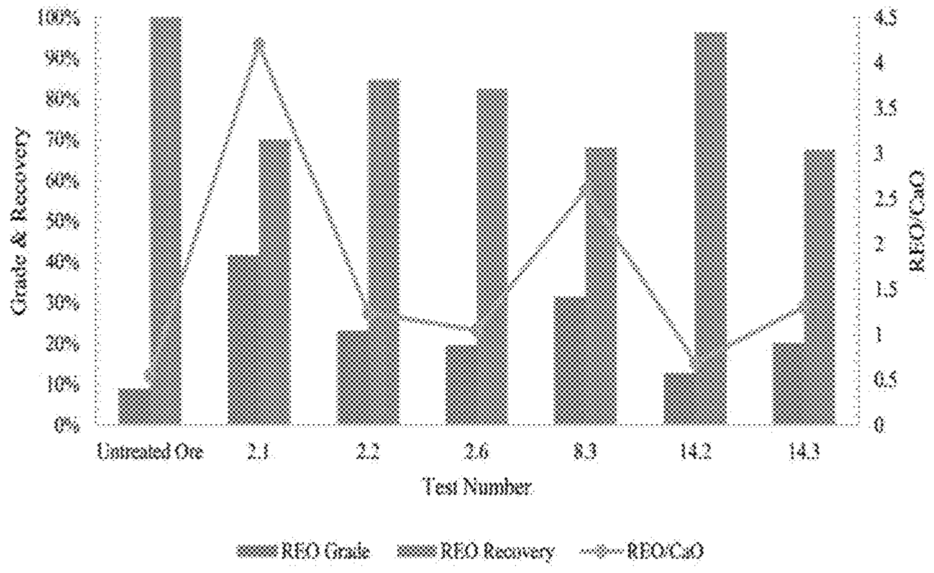
FIG. 26: The best bench flotation results from each collector and the run of mine (ROM) ore and gravity concentrate flotation test work, illustrating grade and overall recovery of REO along with the selectivity in the form of the REO/CaO ratio. The first number is the collector number.

Bench scale flotation was used to optimize flotation conditions for each collector on the ROM ore sample. These tests added more variables including, collector, collector concentration, depressant concentration, temperature, pH, pH modifier and continuous pH modification. The conditions tested were determined from previous research done by Dylan Everty. [6] From his design of experiments a minimum of four conditions for each collector were chosen for further study. For collector 2 six conditions were tested. Two of the test conditions were ones that Dylan Everly had obtained the best results of each collector with and the remaining tests were determined by the Design Expert 10 optimization study software developed by Stat-Ease. FIG. 26 shows the best tests results obtained from these experiments. Table 14 are the conditions that each of those tests were completed using.

TABLE 14

Test conditions for the bench scale experiments that showed the most promising results.

| Test Number | Concentration (M) | pH | pH Modifier | Continued pH Modification | Temperature (° C.) | Depressant Concentration (mM) |
|---|---|---|---|---|---|---|
| 2.1 | 7.50E−03 | 9 | Soda Ash | Yes | 82 | 0 |
| 2.2 | 7.50E−03 | 10 | KOH | No | 50 | 0 |
| 2.6 | 1.00E−02 | 10 | KOH | No | 20 | 0.75 |
| 8.3 | 2.50E−03 | 11 | Soda Ash | No | 82 | 0.75 |
| 14.2 | 3.00E−04 | 9 | Soda Ash | No | 82 | 0.75 |
| 14.3 | 1.00E−04 | 9 | Soda Ash | Yes | 82 | 1.5 |

No tests using collector 5 are shown because none of them exhibited selectivity to rare earths, and in some cases the REO grade decreased from that of the feed. Again, the experiments completed using collector 2 exhibited the most selectivity, but collector 8 also showed that it could have high selectivity along with an increased REO grade. Collector 14 did not have high selectivity, but it showed promise in that the REO recovery was high. Test 2.1 stood out as the best flotation experiment with a REO grade of 42% while maintaining a REO recovery of 70%. The selectivity of REO was also extremely high compared with the other gangue minerals. CaO had a recovery of 9%, BaO was 5% and silicates were also 5% recovered.

These bench scale flotation tests were then scaled up to 10 kilograms of feed material to prove the process on a larger scale. The reagent additions were scaled up at a 1:1 ratio with the exception of frother. Flotation was conducted for times varying from 2-8 minutes to get an idea of how increased flotation time would affect the results.

Figure 27:
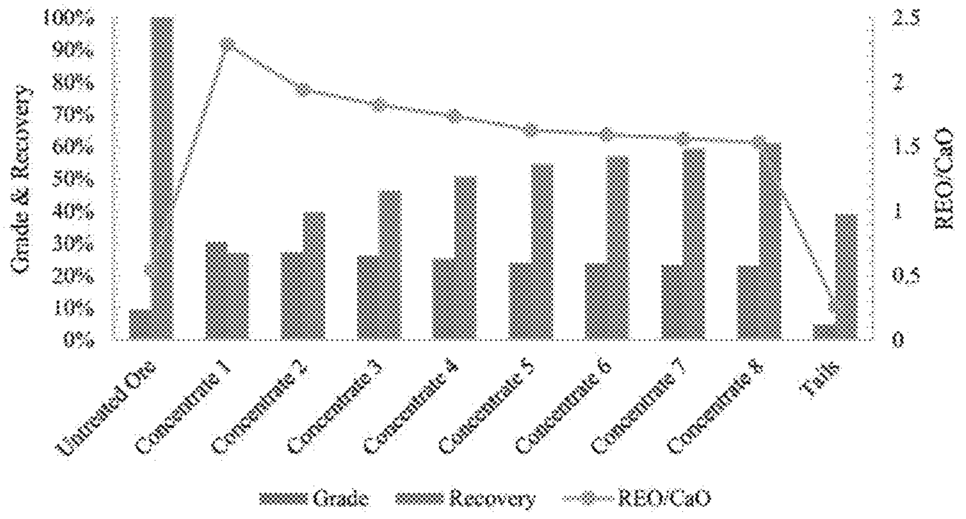
FIG. 27: Results from the large scale flotation tests using the test conditions of 2.2 from the bench scale flotation. The concentrates are cumulative by the minute.
Figure 28:
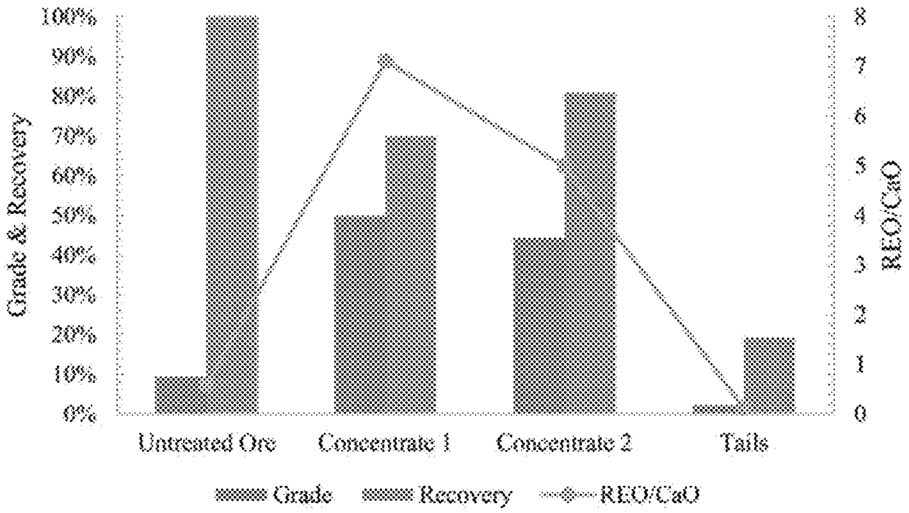
FIG. 28: Results from the large scale flotation tests using the test conditions of 2.1 from the bench scale flotation. The concentrates are cumulative by the minute.
Figure 29:
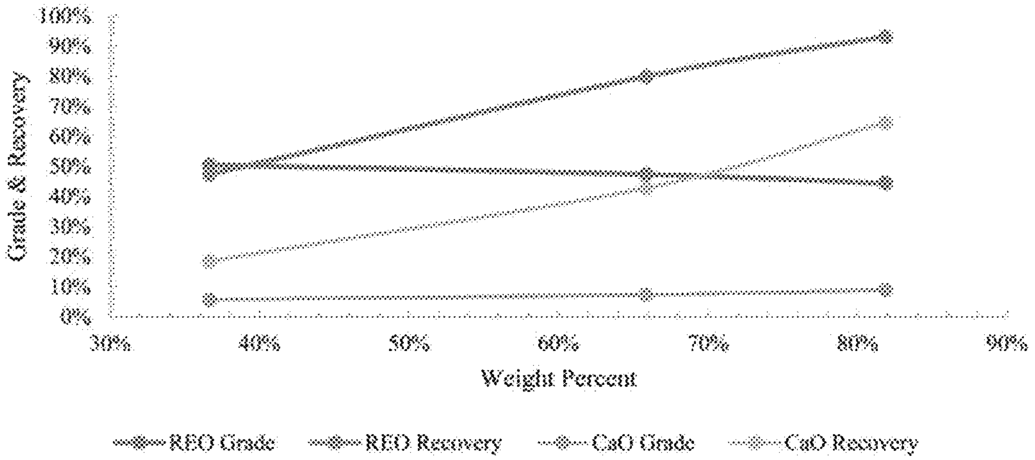
FIG. 29: The relationship between weight percent of recovered material and grade and recovery for REO and calcite.

Only two of the large scale flotation tests produced results that were similar to their corresponding bench scale flotation results. Both of these tests were completed using collector 2. They are illustrated in FIGS. 27 and 28. The test shown in FIG. 27 was completed with the same conditions as bench test 2.2. Even after eight minutes of flotation the REO recovery was still slightly lower, at 61%, than what had been seen on the bench scale, which was 85%. The REO grade was not increased from what had be exhibited on the bench scale, both showed grades of 23%. The only redeeming result was that the selectivity had increased from a REO/CaO ratio of 1.25 to 1.5.

Figure 4:
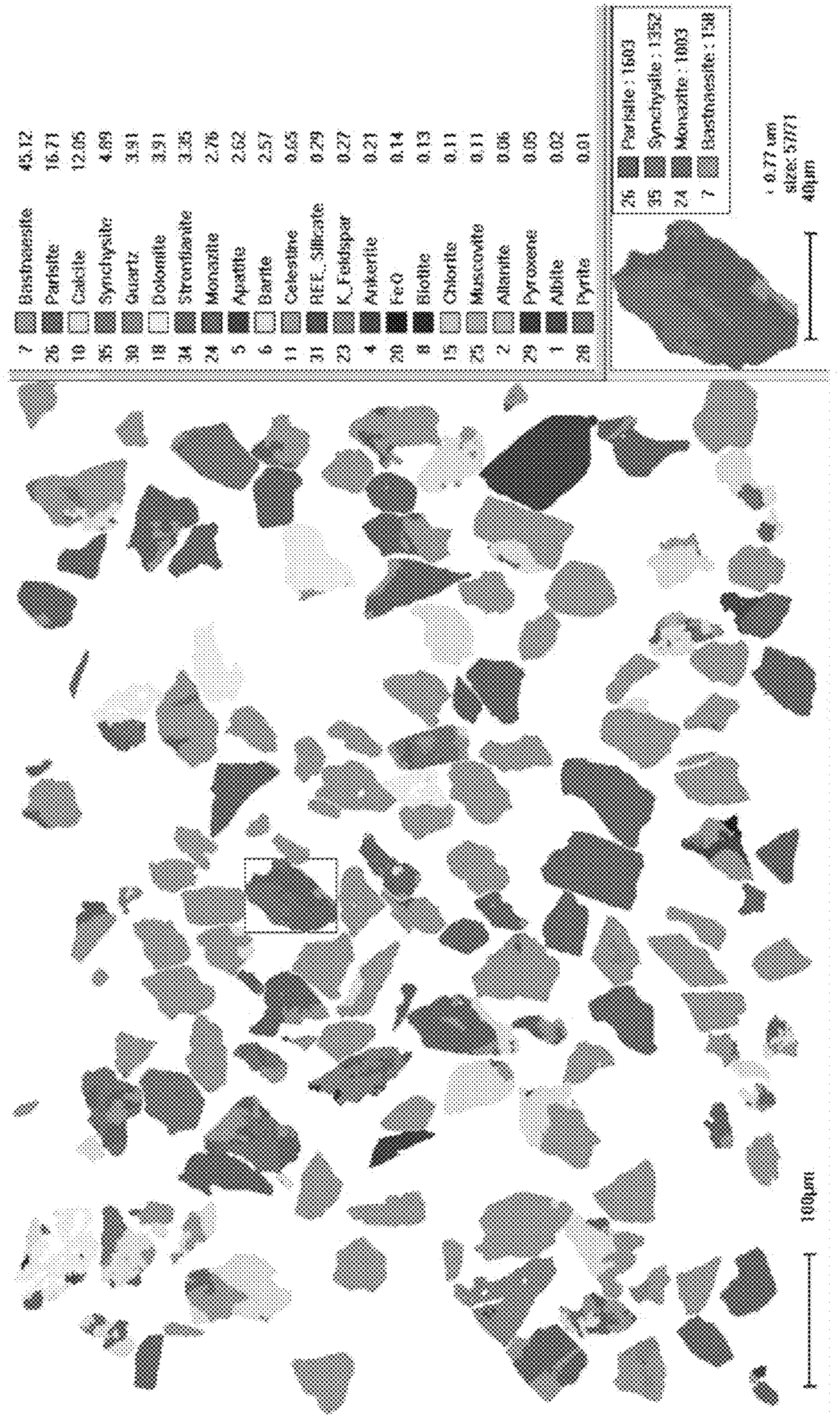
FIG. 4: False-color image from MLA of MPC material. Values represent surface are percentages.

FIG. 4 illustrates the most promising test result from the large scale flotation. This test used conditions from bench test 2.1. This test exhibited extremely high selectivity of bastnaesite over the gangue minerals, the REO/CaO ratio is 7. The grade and recovery from this test closely resembled the result obtained from these conditions on the bench scale. After one minute of flotation, the REO grade was 49.9% and the REO recovery was 69.8%. The recovery of calcite was 5.6%, barite was 3.1% and silicates was 3.4% in the first minute. After two minutes of flotation, the REO grade had decreased to 44.4% and recovery had increased to 80.8%. The gangue mineral recoveries were 9.2% for calcite, 5.0% for barite and 5.6% for the silicate minerals. The modal mineral concentrations of each of the concentrates and the ore sample are shown in Table 15.

TABLE 15

The modal mineral concentrations in cumulative weight percent from the large scale flotation testing.

| Mineral | ROM Ore Sample | Concentrate 1 | Concentrate 2 |
|---|---|---|---|
| Bastnaesite | 12.90 | 59.00 | 52.24 |
| Calcite | 21.30 | 8.75 | 11.20 |
| Dolomite | 16.20 | 4.83 | 6.25 |
| Barite | 20.90 | 5.84 | 7.01 |
| Parasite | 1.81 | 4.19 | 4.00 |
| Monazite | 0.84 | 4.31 | 4.40 |
| Synchysite | 0.67 | 3.21 | 3.23 |
| Quartz | 5.97 | 1.38 | 1.75 |

The concentrate from the best flotation test was then used for a gravity separation test. The conditions for this feed had already been optimized by Alex Norgren for an ultrafine Falcon concentrator. [8] To be able to scale the Falcon results up to plant scale, a concentrate weight is required. Since the bowl is only able to hold a limited amount of material, multiple passes needed to be made. For this test 1462.1 grams of the flotation concentrate were used. The rare earth oxide (REO) head grade of the feed, as determined by the XRF, was 39.0% and for calcite it was 11.3%. The difference in feed grade compared to the flotation product could be due to preferential splitting. Each pass was run in succession, with the tailings from the previous pass being used as the feed for the next one. The flow rate was kept constant between all the passes at 5 L/min. The slurry density was 15 weight percent solids for each pass and the rpms of the Falcon were kept at 1313 for all the passes.

The results of this test are illustrated in FIG. 5, along with the modal mineral concentrations on each pass shown in Table 16. It is modeled by weight percent of recovered material, so that the grades and recoveries of REO and CaO can be modeled using the equations below. As the total material recovered increases, the REO grade decreases, while REO recovery increases. The grade and recovery of CaO increases with increased recovered material.

$$CaO=0.0911*x^2-0.037*x+0.0582 \quad (1)$$

$$CaO\ Recovery=1.1614*x^2-0.3569*+0.1596 \quad (2)$$

$$REO\ Grade=-0.1648*x^2+0.0605*x+0.5048 \quad (3)$$

$$REO\ Recovery=-0.6235*x^2+1.7502*x-0.0834 \quad (4)$$

TABLE 16

The modal mineral concentrations in cumulative weight percent of the gravity concentration tests.

| Mineral | ROM Ore Sample | Concentrate 1 | Concentrate 2 | Concentrate 3 |
|---|---|---|---|---|
| Bastnaesite | 12.90 | 63.70 | 61.93 | 58.11 |
| Calcite | 21.30 | 6.06 | 7.18 | 9.24 |
| Dolomite | 16.20 | 3.30 | 4.03 | 5.01 |
| Barite | 20.90 | 6.64 | 6.50 | 6.43 |
| Parasite | 1.81 | 3.48 | 3.70 | 3.71 |
| Monazite | 0.84 | 5.11 | 4.38 | 4.12 |
| Synchysite | 0.67 | 2.59 | 2.83 | 2.92 |
| Quartz | 5.97 | 1.02 | 1.22 | 1.64 |

Where x is weight percent of the solids recovered and the grade and recovery are in percent. From these equations we can estimate grades and recoveries within the 37% solids removed and 82% solids recovered range. Since it is undesirable to lower the recovery of REO, a high recovery is required. A REO recovery of 90% or greater was desired from this process, so that the overall recovery of REO would be above 70% total, after accounting for flotation. For this recovery to be met 77.7% of the solids would need to be recovered. The REO grade is predicted to be 45.2%, with a CaO recovery of 58.2% and a CaO grade of 8.4%. With this process there is a slight decrease in grade of the calcite, but a significant amount will be removed, while still upgrading the REO grade.

CONCLUSIONS

This rare earth separations study was done to find a process that incorporated flotation and gravity separation in an economical way to upgrade the rare earth content of an ore. Microflotation experiments were conducted using the data from the flotation fundamentals. It was found that for the gravity concentrated ore the recovery of calcite was decreased, and the grade of the rare earth bearing minerals was also decreased in some cases. Collector 2 showed itself to be the best performing on this scale. From these experiments it was determined that further study would focus on flotation followed by gravity separation. Bench scale flotation tests were conducted and again collector 2 proved to produce the most promising results for flotation. The best test had a rare earth oxide grade of 42% and a recovery of 70%, while rejecting 90% of the calcite. On the larger scale test work only one test proved to be promising, which also utilized collector 2. After a two minute flotation the rare earth oxide, the grade was 44.4% and the recovery was 81%, while rejecting 91% of the calcite. The concentrate from that large scale flotation test was used for gravity separation on the ultrafine falcon concentrator. It was found that the falcon could reject another 40% of the calcite while still maintaining a rare earth oxide stage recovery of 90%.

TABLE 16

| # | Chemical Structure | IUPAC Name | CAS# | Ref |
|---|---|---|---|---|
| #1 | 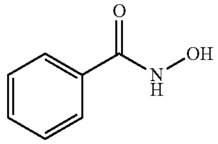 | N-hydroxybenzamide | 495-18-1 | |
| #2 | 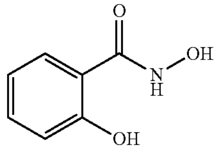 [SMILES: O=C(NO)c1ccccc1O] | N,2-dihydroxybenzamide | 89-73-6 | |
| #3 | 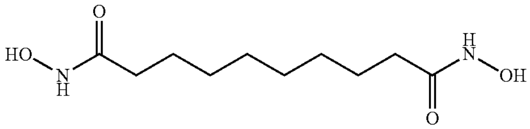 [SMILES: O=C(CCCCCCCCC(=O)NO)NO] | N1,N10-dihydroxydecanediamide | 5578-84-7 | 1 |
| #4 | 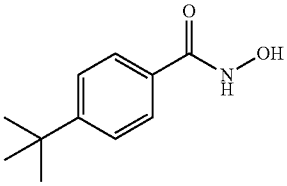 | 4-(tert-butyl)-N-hydroxybenzamide | 62034-73-5 | 2 |
| #5 | 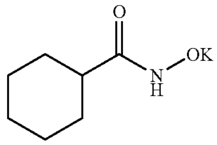 | N-hydroxycyclohexane-carboxamide potassium salt | 13810-02-1 (N hydroxycyclohexane-carboxamide) | 2 |
| #6 | 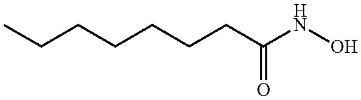 | N-hydroxyoctanamide | 7377-03-9 | |
| #7 | 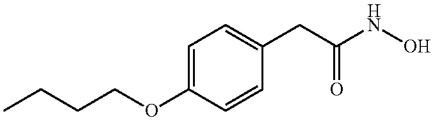 [SMILES: CCCCOc1ccc(CC(=O)NO)cc1] | 2-(4-butoxyphenyl)-N-hydroxyacetamide | | Patent No. IN 175080 |
| #8 | 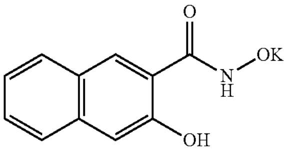 | N,3-dihydroxy-2-naphthamide potassium salt | 22974-74-9 (N,3-dihydroxy-2¬ naphthamide) | 3 |
| #9 | 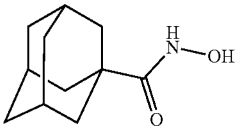 [SMILES: O=C(NO)C12CC3CC(CC(C3)C1)C2] | (3r,5r,7r)-N-hydroxyadamantane-1-carboxamide | | |
| #10 | 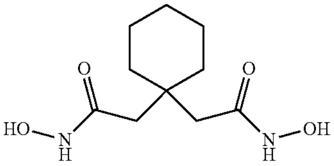 [SMILES: O=C(CC1(CC(=O)NO)CCCCC1)NO] | 2,2'-(cyclohexane-1,1-diyl)bis(N-hydroxyacetamide) | | |

TABLE 16-continued
| # | Chemical Structure | IUPAC Name | CAS# | Ref |
|---|---|---|---|---|
| #11 | 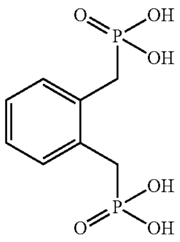 [SMILES: O=P(O)(O)Cc1ccccc1CP(=O)(O)O] | (1,2-phenylenebis (methylene))bis (phosphonic acid) | 42104-58-5 | 4 |
| #12 | 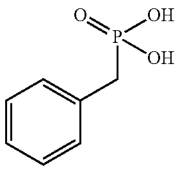 [SMILES: O=P(O)(O)Cc1ccccc1] | benzylphosphonic acid | 6881-57-8 | |
| #13 | 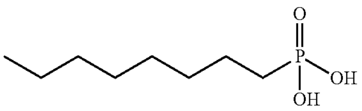 | octylphosphonic acid | 4724-48-5 | 4724-48-5 |
| #14 | 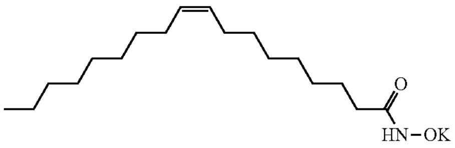 | N-hydroxyoleamide potassium salt | 10335-69-0 (N hydroxyoleamide) | |
| #15 | 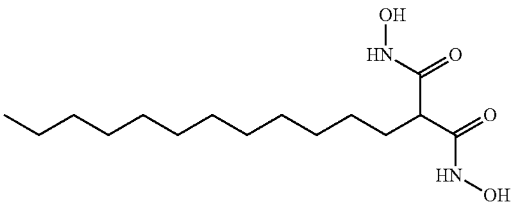 [SMILES: CCCCCCCCCCCCC(C(=O)NO)C(=O)NO] | 2-dodecyl-N1,N3-dihydroxymalonamide | | |
| #16 | 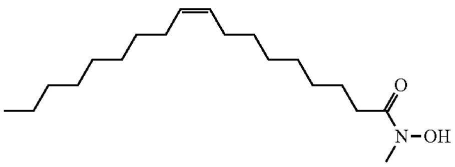 [SMILES: CCCCCCCC/C=C\CCCCCCCC(=O)N(C)O] | N-hydroxy-N-methyloleamide | | NA |

TABLE 16-continued

| # | Chemical Structure | IUPAC Name | CAS# | Ref |
|---|---|---|---|---|
| #18 | 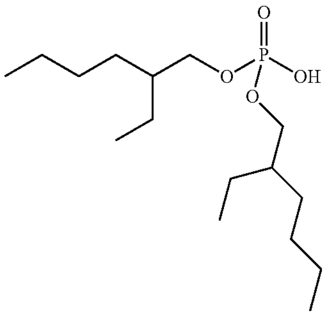 [SMILES: CCCCC(CC)COP(=O)(O)OCC(CC)CCCC] | bis(2-ethylhexyl) hydrogen phosphate | 298-07-7 | |

NA—not available

Compounds #1, #2, #6, #12, #13, and #18 were purchased from commercial sources.

Compounds #3, #4, #5, #7, #8, #9, #11, and #14 were synthesized at Oak Ridge National Laboratory according to the literature procedures (see the corresponding references).

#10, #15 and #16 are new compounds and were synthesized at Oak Ridge National Laboratory as follows: 2,2'-(cyclohexane-1,1-diyl)bis(N-hydroxyacetamide) (#10). N,N'-Carbonyl diimidazole (3.0 eq.) was added to a solution of 1,1 cyclohexanediacetic acid (1.0 eq.) in THF (0.6M) and the reaction mixture was stirred under argon at room temperature for 12 hours. Hydroxylamine hydrochloride (4.0 eq.) was then added and the reaction mixture was stirred at room temperature for another 12 hours. 5% Potassium bisulfate solution in water was added to the reaction mixture, product was extracted with EtOAc (2x), organic layers were combined, washed with saturated NaCl solution and dried over MgSO4. After the removal of solvents under reduced pressure, the oily residue was diluted with Et2O, the precipitate that formed was filtered, rinsed with Et2O and dried to afford #10 as a white powder. 1H NMR (400 MHz, CD3Cl) 10.95 (s, 2H), 7.01 (s, 2H), 2.62 (s, 4H), 1.52-1.30 (m, 10H). 13C NMR (100.66 MHz, CD3Cl) 168.9, 134.9, 121.1, 44.1, 36.1, 32.5, 25.8, 21.6. HRMS m/z: [M + Na]+, calculated for C10H18N2O4, 253.11590; found 253.11630. 2-dodecyl-N1,N3-dihydroxymalonamide (#15). 2-Dodecyl-N1,N3-dihydroxymalonamide was synthesized from dimethyl 2¬ dodecylmalonate (ref. 8) according to the general procedure by Nome et al. (ref. 6) Product #15 was obtained as a white powder. 1H NMR (400 MHz, DMSO-d6) ~10 (bs, 2H), 2.84 (t, J = 7.5 Hz, 1H), 1.62 (q, J = 14.9, 7.5 Hz, 2H), 1.32-1.04 (m, 20H), 0.85 (t, J = 6.7 Hz, 3H). 13C NMR (100.66 MHz, DMSO-d6) 174.4, 166.0, 47.5, 31.3, 29.12, 29.10, 29.08, 29.0, 28.8, 28.77, 28.5, 26.8, 24.2, 22.1. HRMS m/z: [M + Na]+, calculated for C15H30N2O4, 325.20980; found 325.21070. N-hydroxy-N-methyloleamide (#16). To a solution of N-methylhydroxylamine hydrochloride (1.0 eq.) in DI water (0.4M) was added Na2CO3 (2.0 eq.) and Et2O (0.2M) at 0 0C, followed by the addition of oleoyl chloride (1.0 eq.). The reaction mixture was stirred at this temperature for 1 hour. Afterwards, to this mixture saturated NaHCO3 solution was added, product was extracted with Et2O (2x), organic layers were combined, washed with saturated NaCl solution and dried over MgSO4. After the removal of solvents under reduced pressure, product was obtained as a yellow, viscous oil. 1H NMR (400 MHz, CD3Cl) ~8.8 (bs, 1H), 5.42-5.28 (m, 2H), 3.35 (s, 3H), 2.39-2.25 (m, 2H), 2.09-1.92 (m, 4H), 1.74-1.56 (m, 2H), 1.41-1.18 (m, 18H), 0.94-0.81 (m, 3H). 13C NMR (100.66 MHz, CD3Cl) 179.0, 130.1, 129.9, 34.3, 32.0, 29.9, 29.8, 29.7, 29.46, 29.4, 29.3, 29.2, 27.4, 27.3, 25.0, 22.8, 14.3. HRMS m/z: [M + Na]+, calculated for C19H37NO2, 334.27170; found 334.27310.

We claim:

1. A method for upgrading of ore containing rare earth elements, comprising:

feeding a slurry of ground ore having a size of less than about 55 microns into a gravity concentrator, wherein the ground ore has a first weight percent of rare earth oxides and a first weight percent of calcium, and wherein the ground ore comprises bastnaesite, at greater than about 35% by weight;

spinning the ground ore at between 850 rpm and 1500 rpm;

separating the ground ore based on density;

recovering an ore fraction having a second weight percent of rare earth oxides that is higher than the first weight percent of rare earth oxides, and a second weight percent of calcium that is lower than the first weight percent of calcium; and thereby upgrading the ground ore.

2. The method of claim 1, wherein the size of the ground ore is P80 of 35 microns.

3. The method of claim 2, wherein the ground ore fed into the gravity concentrator as a slurry comprises about 10 to 25% solids by weight.

4. The method of claim 3, wherein the ground ore fed into the concentrator is 15.1% solids by weight.

5. The method of claim 4, wherein the ground ore has been subjected to wet sieving at screen sizes of between 50 and 600 mesh.

6. The method of claim 5, wherein the screen sizes are 100, 200, 400, and 500 mesh.

7. The method of claim 6, wherein the ground ore is separated by floatation prior to feeding it into the gravity concentrator.

8. The method of claim 7, wherein a collector selected from one or more of N-hydroxybenzamide, N,2-dihydroxybenzamide, N1,N10-dihydroxydecanediamide, 4-(tert-butyl)-N-hydroxybenzamide, N-hydroxycyclohexanecarboxamide potassium salt, N-hydroxyoctanamide, 2-(4-butoxyphenyl)-N-hydroxyacetamide, N,3-dihydroxy-2-naphthamide potassium salt, (3r,5r,7r)-N-hydroxyadamantane-1-carboxamide, 2,2'-(cyclohexane-1,1-diyl)bis(N-hydroxyacetamide), (1,2-phenylenebis(methylene))bis(phosphonic acid), benzylphosphonic acid, octylphosphonic acid, N-hydroxyoleamide potassium salt, 2-dodecyl-N1,N3-dihydroxymalonamide, N-hydroxy-N-methyloleamide, bis(2-ethylhexyl) hydrogen phosphate and fatty acid are used.

9. The method of claim 8, wherein the collector is one of N-hydroxybenzamide, N,2-dihydroxybenzamide, N-hydroxycyclohexanecarboxamide potassium salt, N-hydroxyoctanamide, N,3-dihydroxy-2-naphthamide potassium salt, and fatty acid.

10. The method of claim 9, wherein the gravity concentrator is a UF Falcon concentrator.

11. The method of claim 1, wherein the ground ore fed into the gravity concentrator comprises about 10 to 25% solids by weight.

12. The method of claim 1, wherein the ground ore has been subjected to wet sieving at screen sizes of between 50 and 600 mesh.

13. The method of claim 2, wherein the ground ore has been subjected to wet sieving at screen sizes of between 50 and 600 mesh.

14. The method of claim 1, wherein the ground ore is separated by floatation prior to feeding it into the gravity concentrator, wherein a collector is used selected from one or more of N-hydroxybenzamide, N,2-dihydroxybenzamide, N-hydroxycyclohexanecarboxamide potassium salt, N-hydroxyoctanamide, N,3-dihydroxy-2-naphthamide potassium salt, and fatty acid.

15. The method of claim 2, wherein the ground ore is separated by floatation prior to feeding it into the gravity concentrator, wherein a collector is used selected from one or more of N-hydroxybenzamide, N,2-dihydroxybenzamide, N-hydroxycyclohexanecarboxamide potassium salt, N-hydroxyoctanamide, N,3-dihydroxy-2-naphthamide potassium salt, and fatty acid.

16. The method of claim 4, wherein the ground ore is separated by floatation prior to feeding it into the gravity concentrator, and wherein a collector is used selected from one or more of N-hydroxybenzamide, N,2-dihydroxybenzamide, N-hydroxycyclohexanecarboxamide potassium salt, N-hydroxyoctanamide, N,3-dihydroxy-2-naphthamide potassium salt, and fatty acid.

* * * * *